(12) United States Patent
Fehr

(10) Patent No.: US 9,936,623 B2
(45) Date of Patent: Apr. 10, 2018

(54) PLOW WITH RESETTABLE PLOW BOTTOM

(71) Applicant: Fehr's Industrial Manufacturing, LLC, Seminole, TX (US)

(72) Inventor: John Fehr, Seminole, TX (US)

(73) Assignee: Fehr's Industrial Manufacturing, LLC, Seminole, TX (US)

( * ) Notice: Subject to any disclaimer, the term of this patent is extended or adjusted under 35 U.S.C. 154(b) by 403 days.

(21) Appl. No.: 14/558,452

(22) Filed: Dec. 2, 2014

(65) Prior Publication Data

US 2015/0150186 A1 Jun. 4, 2015

Related U.S. Application Data

(60) Provisional application No. 61/910,903, filed on Dec. 2, 2013.

(51) Int. Cl.
*A01B 61/04* (2006.01)
*A01B 3/26* (2006.01)

(52) U.S. Cl.
CPC .............. *A01B 61/046* (2013.01); *A01B 3/26* (2013.01)

(58) Field of Classification Search
CPC ........................... A01B 61/044; A01B 61/046
See application file for complete search history.

(56) References Cited

U.S. PATENT DOCUMENTS

| | | | | |
|---|---|---|---|---|
| 3,189,102 A * | 6/1965 | Brown | ............... | A01B 61/044 172/266 |
| 3,586,110 A * | 6/1971 | King | ............... | A01B 61/044 172/269 |
| 3,910,354 A * | 10/1975 | Johnson | ............... | A01B 61/044 172/267 |
| 4,054,177 A * | 10/1977 | Quanbeck | ............... | A01B 61/044 172/267 |
| 4,116,280 A * | 9/1978 | Rehn | ............... | A01B 61/044 172/266 |
| 4,167,977 A * | 9/1979 | Geurts | ............... | A01B 61/044 172/267 |
| 4,236,583 A * | 12/1980 | Geurts | ............... | A01B 61/046 172/266 |
| 4,312,407 A * | 1/1982 | Crosby | ............... | A01B 61/044 172/261 |
| 4,519,461 A * | 5/1985 | Harden | ............... | A01B 61/044 172/225 |

(Continued)

FOREIGN PATENT DOCUMENTS

| | | | | |
|---|---|---|---|---|
| FR | 2249602 A1 * | 5/1975 | ............. | A01B 1/044 |
| FR | 2279319 A1 * | 2/1976 | ........... | A01B 61/044 |

OTHER PUBLICATIONS

Marchesan TATU plow (photos), Model No. AARP, by Marchesan Implementos, Nov. 2011, 66 pages.

*Primary Examiner* — Matthew D Troutman

(57) ABSTRACT

A plow bottom is configured to be easily reset when striking a rock while plowing. The plow operator may set the force required for the plow bottom to disengage using the adjustment switch. Once the shank strikes an object, the plow bottom will disengage. The plow operator then lifts the plow assembly using the tractor to raise the plow bottoms out of the ground. A spring then forces the disengaged plow bottom to reengage. Once the plow bottom is reengaged, the plow operator lowers the plow assembly and continues plowing the land.

8 Claims, 23 Drawing Sheets

(56) References Cited

U.S. PATENT DOCUMENTS

| | | | | |
|---|---|---|---|---|
| 5,072,793 A | * | 12/1991 | Grimm | A01B 61/044 111/151 |
| 5,154,239 A | * | 10/1992 | Harrell | A01B 61/044 172/219 |
| 7,021,394 B2 | | 4/2006 | Marchesan | |
| D661,713 S | | 6/2012 | Marchesan | |
| 2012/0272516 A1 | | 11/2012 | Marchesan | |

* cited by examiner

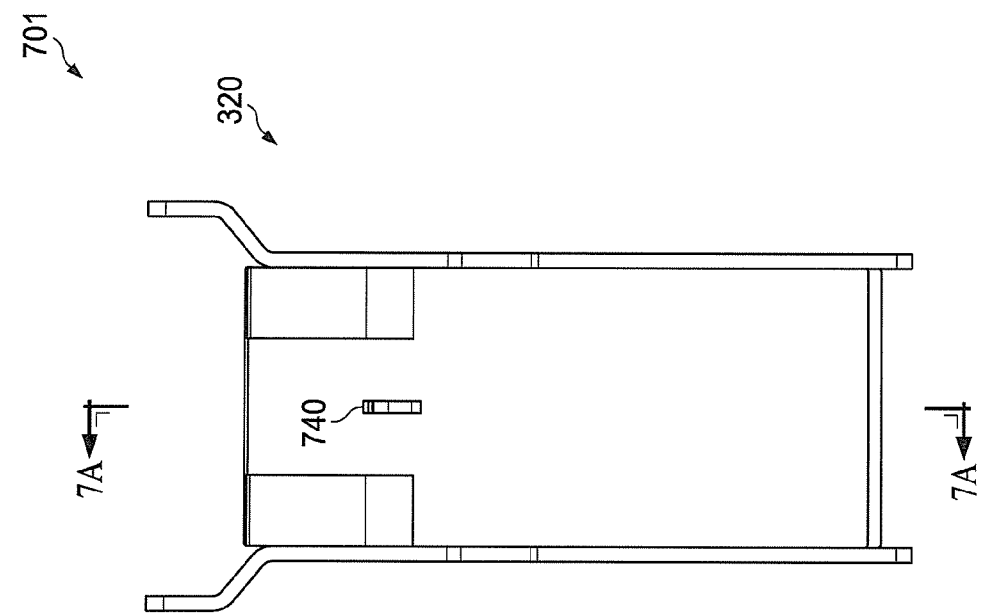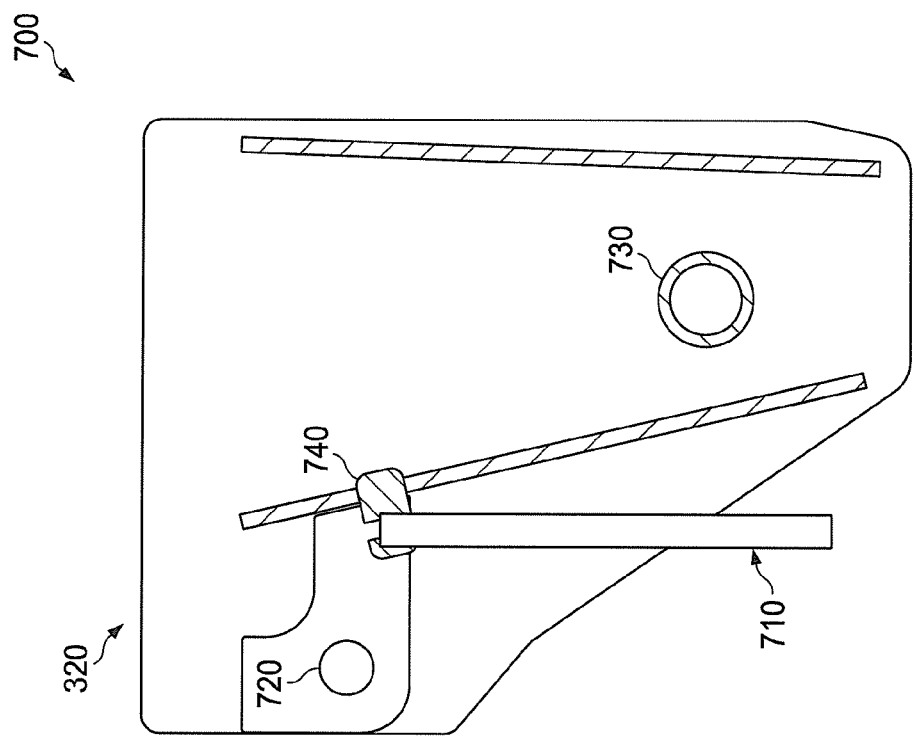

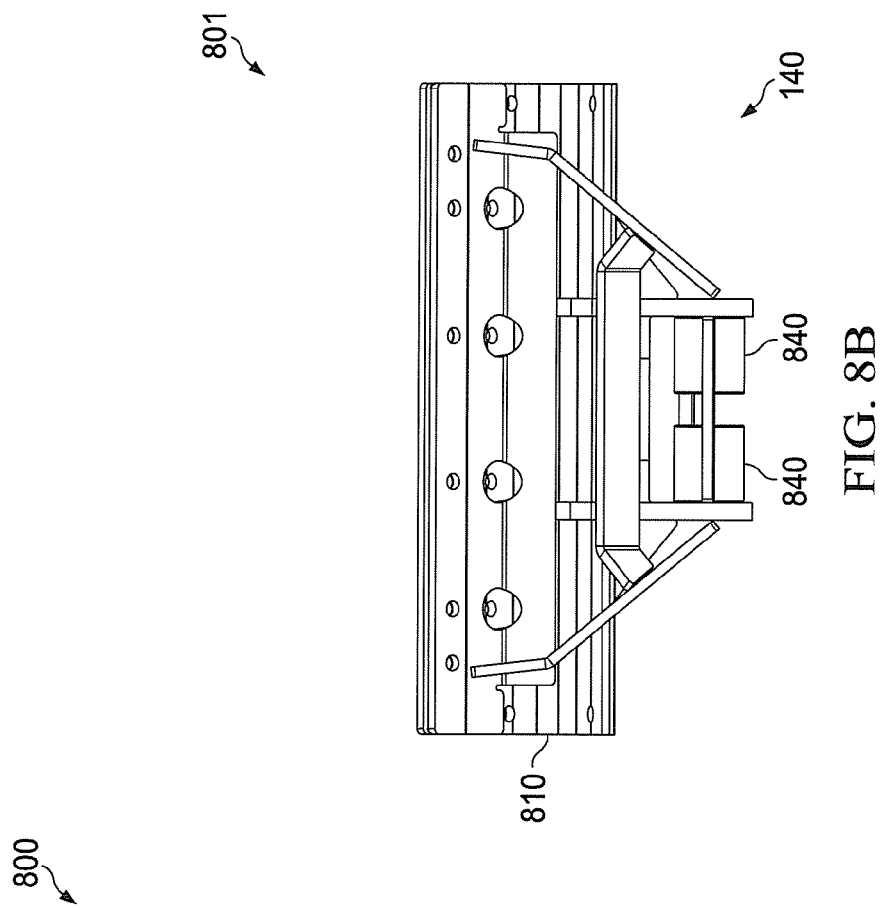
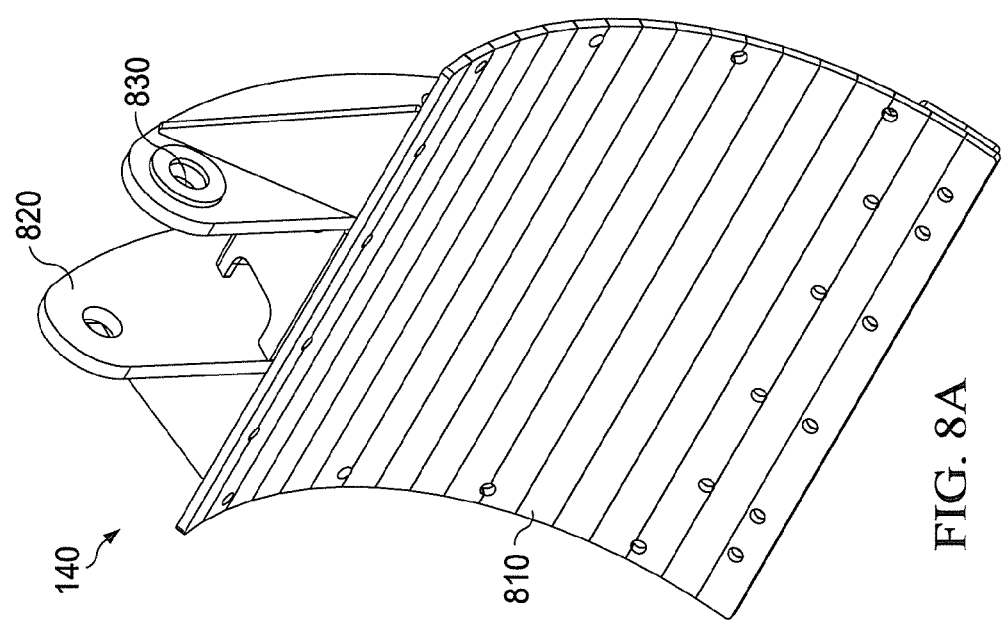

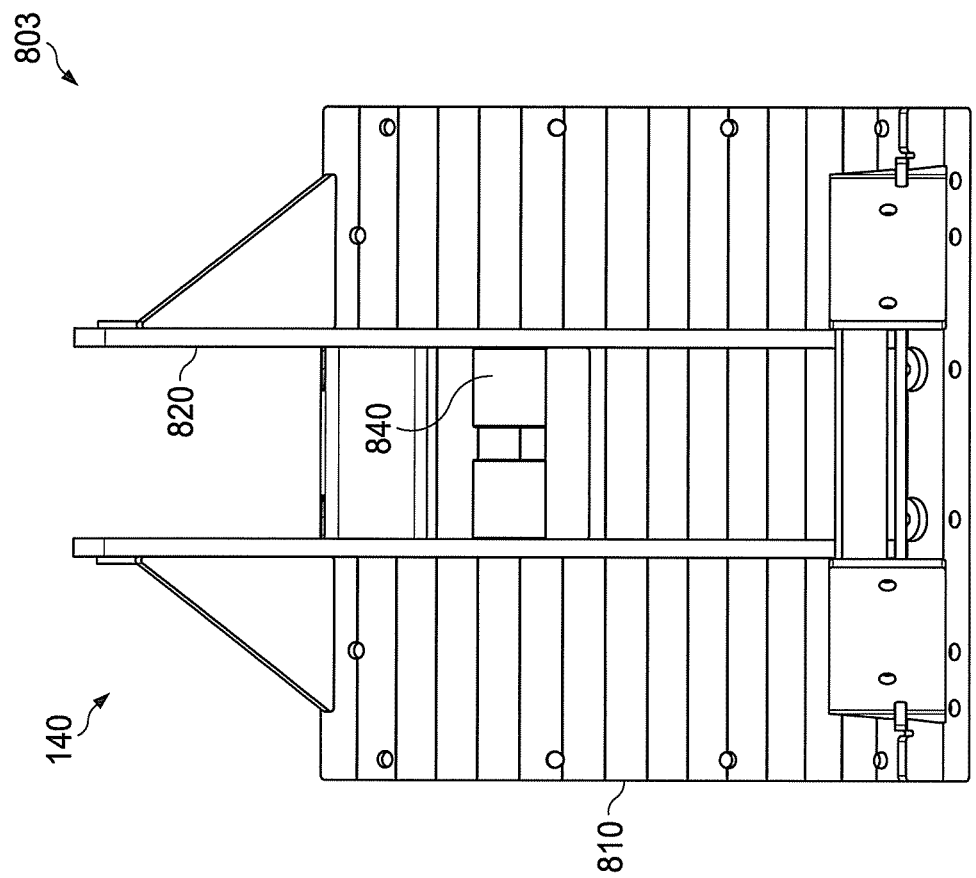
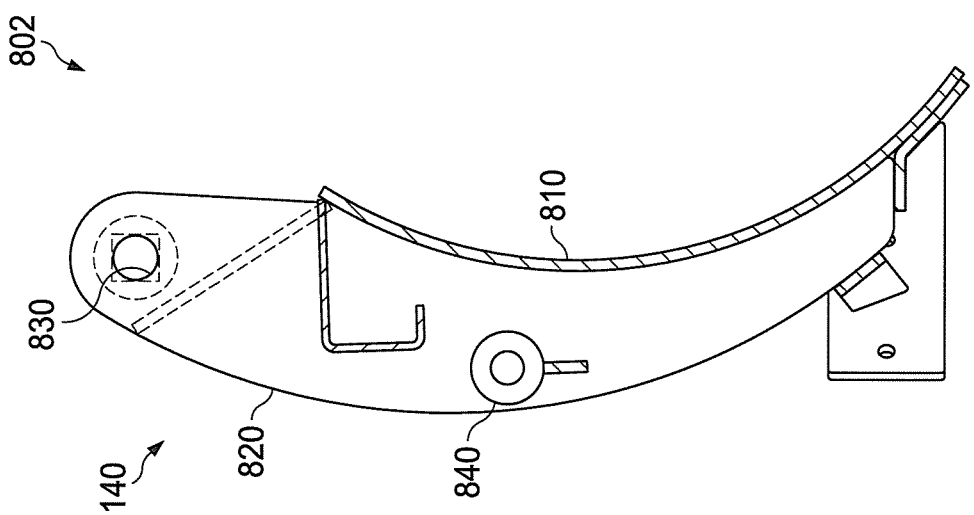
FIG. 8D
FIG. 8C

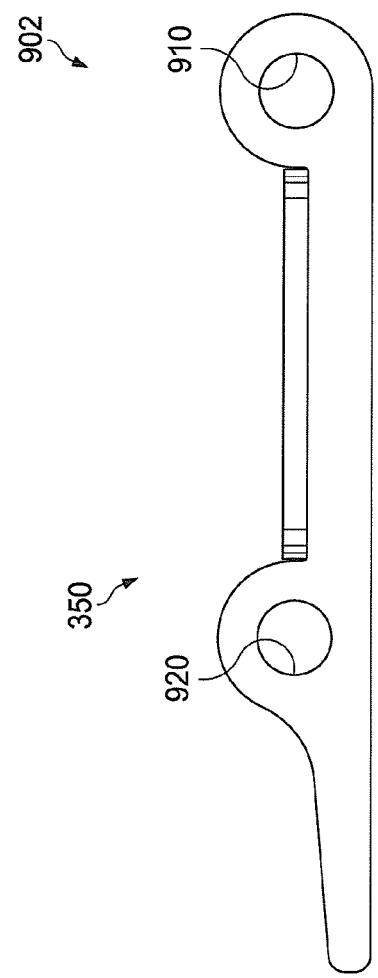
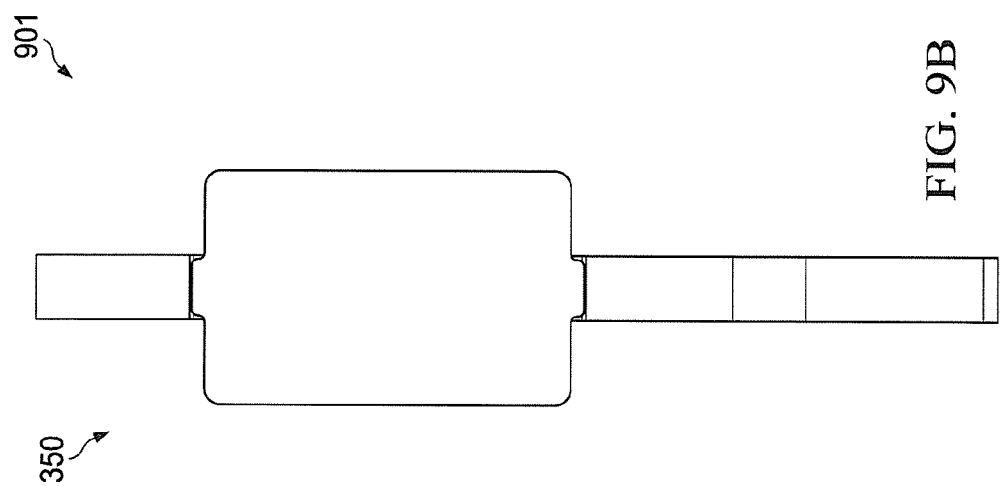
FIG. 9C
FIG. 9B

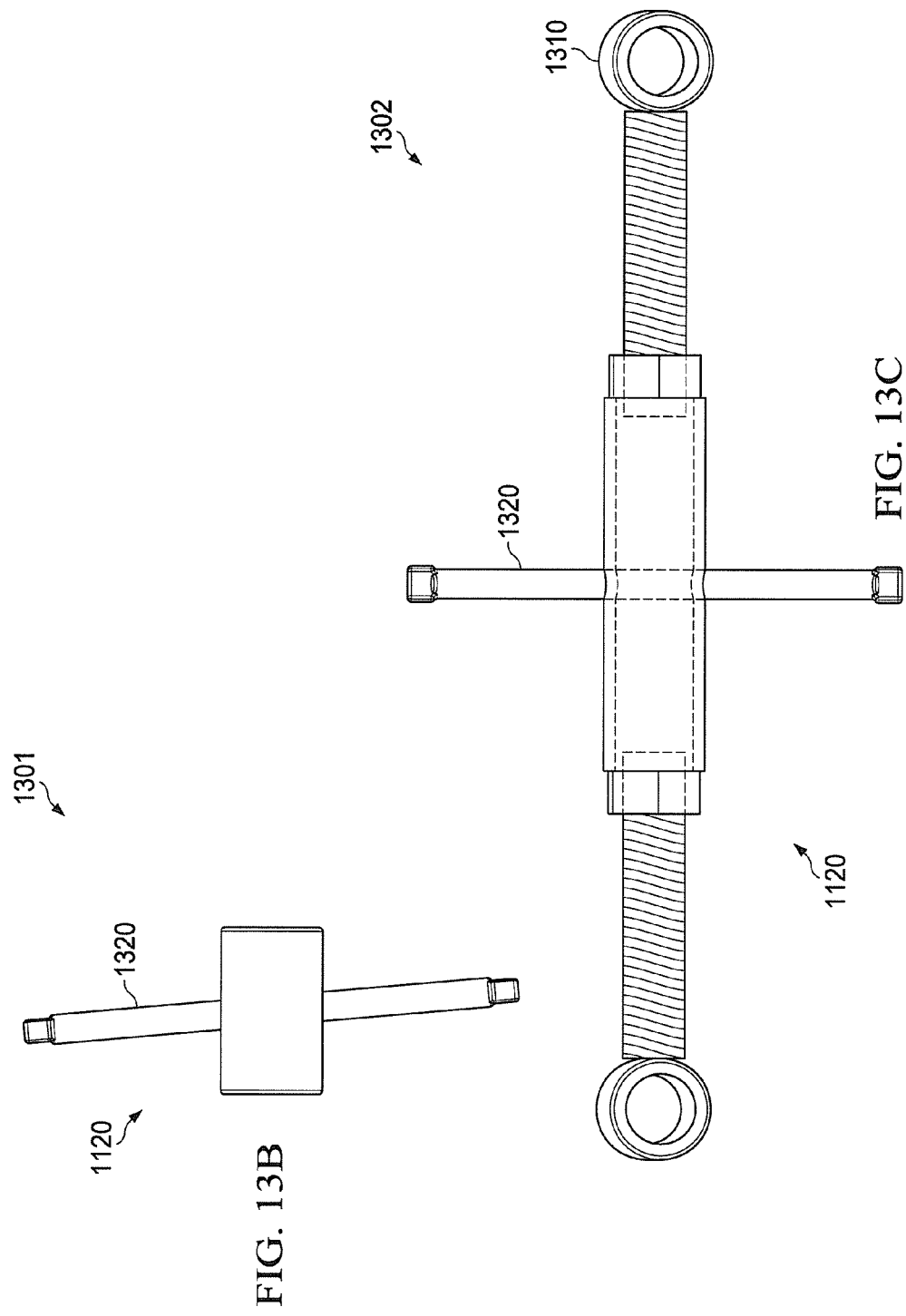

_US 9,936,623 B2_

PLOW WITH RESETTABLE PLOW BOTTOM

CROSS-REFERENCE TO RELATED APPLICATIONS

This application claims the benefit of the filing date of U.S. Provisional Patent Application No. 61/910,903 entitled "PLOW WITH RESETTABLE PLOW BOTTOM" filed Dec. 2, 2013, the content of which is hereby incorporated by reference.

TECHNICAL FIELD

The present application relates generally to plows and more particularly to a plow assembly with plow bottoms that have a trip mechanism and a method in which the plow bottoms trip and reset.

BACKGROUND

Crops require and use essential nutrients from the top soil for growth. Over time nutrients tend to leech lower into the ground, and plowing the field is one way farmers bring the nutrient rich soil to the surface. Some crops, like cotton, leave thick stalks after being harvested which may cause the shanks on a plow to clog if the stalks are left in the fields while plowing. In order to avoid clogging, farmers may shred the cotton stalks and burn the fields. Also, many fields contain rocks, which can cause collision damage to the shanks. In order to protect the shanks, a shear bolt is used to connect the shanks to the plow to avoid damage by having the shear bolt break when the shank strikes a rock. Although use of shear bolts helps avoiding damage to the shank when a rock is struck, resetting the shank takes a significant amount of time. The plow operator must stop plowing the field in order to reset the shank. In order to reset the disengaged shank, the plow operator must walk to the disengaged shank, knock out the broken shear bolt, reengage the shank, replace with a new shear bolt, and then walk back to the cab of the tractor. The plow operator has to repeat this process every time a shank on the plow hits a rock that breaks the shear bolt, greatly reducing the efficiency of plowing a field.

SUMMARY

For a more complete understanding of the present disclosure and its advantages, reference is now made to the following description taken in conjunction with the accompanying drawings, in which like reference numerals represent like parts:

In a first embodiment, a plow assembly with resettable plow bottom for plowing a field is provided. The resettable plow bottom disengages upon striking a rock buried in the soil. The plow assembly is lifted up, so that the plow bottom is raised out of the soil, and a spring is used to reengage the plow bottom.

In particular embodiments, the shanks are larger and angled to turn over the soil, which is a different angle than shanks that merely shift or furrow the soil.

In certain embodiments, the plow bottoms are spread apart to take advantage of the benefits of the larger width shanks, allowing each pass of the tractors to cover more area.

In certain embodiments, the method of disengaging is controlled by an adjustable switch. The adjustable switch is used to control the threshold force required for the plow bottom to disengage.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A through 7C illustrate a shank holder according to embodiments of the present disclosure;

FIGS. 8A through 8D illustrate a shank according to embodiments of the present disclosure;

FIGS. 9A through 9C illustrate a shank stop according to embodiments of the present disclosure;

FIGS. 13A through 13C illustrate a turn buckle according to embodiments of the present disclosure;

DETAILED DESCRIPTION

FIGS. 1 through 15, discussed below, and the various embodiments used to describe the principles of the present disclosure are by way of illustration only and should not be construed in any way to limit the scope of the invention. Those skilled in the art will understand that these principles may be implemented in any type of suitably arranged device or system.

In a first embodiment, a plow assembly with resettable plow bottom for plowing a field is provided. The resettable plow bottom disengages upon striking a rock buried in the soil. The plow assembly is lifted up, so that the shank of the plow bottom is raised out of the soil, and a spring is used to reengage the plow bottom.

In particular embodiments, the shanks are larger and angled to turn over the soil, which is a different angle than shanks that merely shift or furrow the soil.

In certain embodiments, the plow assemblies are spread apart to take advantage of the benefits of the larger width plow bottoms, allowing each pass of the tractors to cover more area.

In certain embodiment, the method of breaking away is controlled by an adjustable switch. The adjustable switch is used to control the threshold force required for the plow bottom to disengage.

Figure 1:
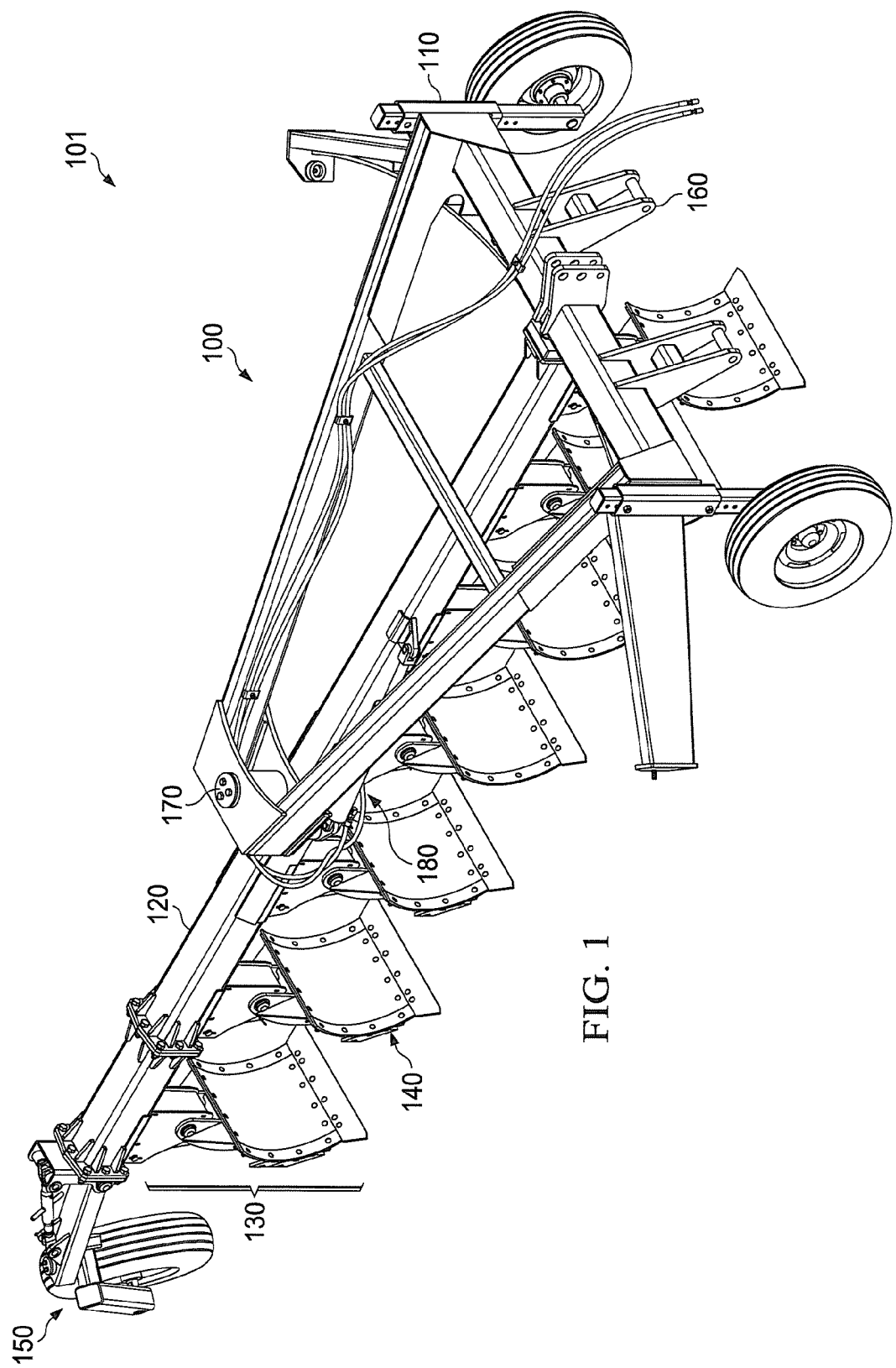
FIG. 1 illustrates a plow assembly in an initial position according to embodiments of the present disclosure.
Figure 2:
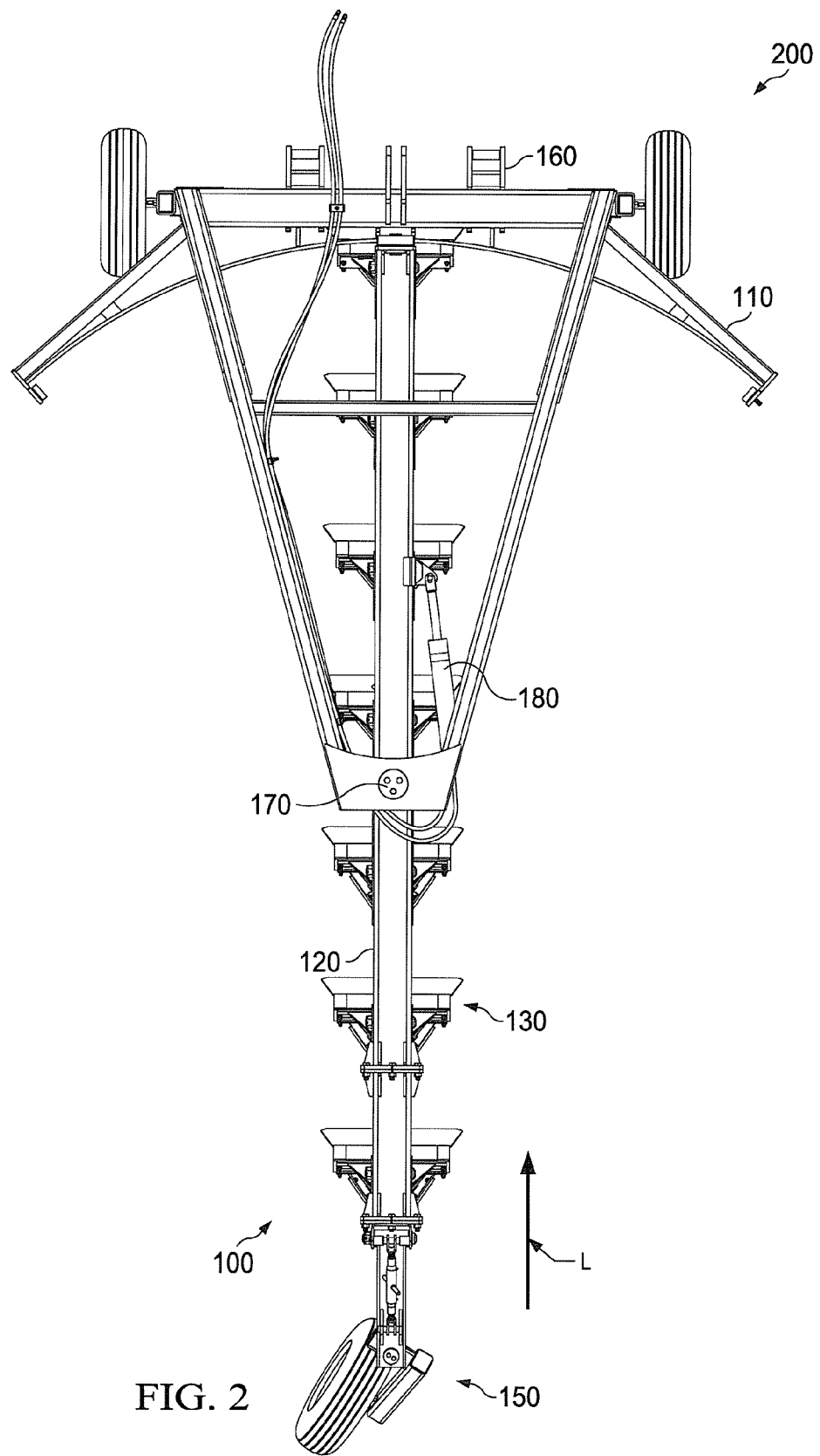
FIG. 2 illustrates a solid top view of the plow assembly of FIG. 1 according to embodiments of the present disclosure.

FIGS. 1 and 2 illustrate a plow assembly 100 according to embodiments of the present disclosure. FIG. 1 illustrates a plow assembly 100 in an initial position 101 according to embodiments of the present disclosure. The embodiment of the plow assembly 100 shown in FIG. 1 is for illustration only. Other embodiments could be used without departing from the scope of this disclosure. The plow assembly 100 is composed of an A-frame 110, a boom 120, multiple plow bottoms 130, and a gage wheel assembly 150.

The plow bottoms 130 are coupled to the boom 120 and spaced evenly. The plow bottoms 130 can be connected by any number of connecting means, including welding. In the embodiment shown in FIG. 1, the plow assembly 100 has seven plow bottoms 130. In other embodiments, the plow assembly 100 may have more or fewer plow bottoms 130. Each plow bottom 130 includes a shank 140.

The gage wheel assembly 150 is used to keep the boom 120 parallel to the ground. A tractor (or other vehicle suitable for pulling the plow) couples to the plow assembly 100 at one or more tractor connections 160.

A swivel connection 170 mechanically connects the A-Frame 110 to the boom 120. The swivel connection 170 allows rotation about the center of the boom 120. That is, boom 120 rotates with respect the A-frame 110 at the swivel connection 170 disposed at the center of the boom 120. The rotation of the boom 120 is controlled by an actuator 180 connected to the bottom of the A-frame 110 and the side of the boom 120. The rotation may be accomplished by other means, including a motor. While in the tractor cab, an operator can adjust the angle of rotation of the boom 120 using the motor or other suitable electromechanical actuator 180. The purpose of rotating the boom 120 is to control the angle of the shanks 140 with respect to the land (namely, the plurality of crop rows). Controlling the angle of the shanks 140 allows for uniform plowing of the field as the tractor moves in opposite directions across the field.

FIG. 2 illustrates a solid top view 200 of the plow assembly 100 according to embodiments of the present disclosure. FIG. 2 includes shadows cast from light shining in the direction of the arrow L.

Figure 3:
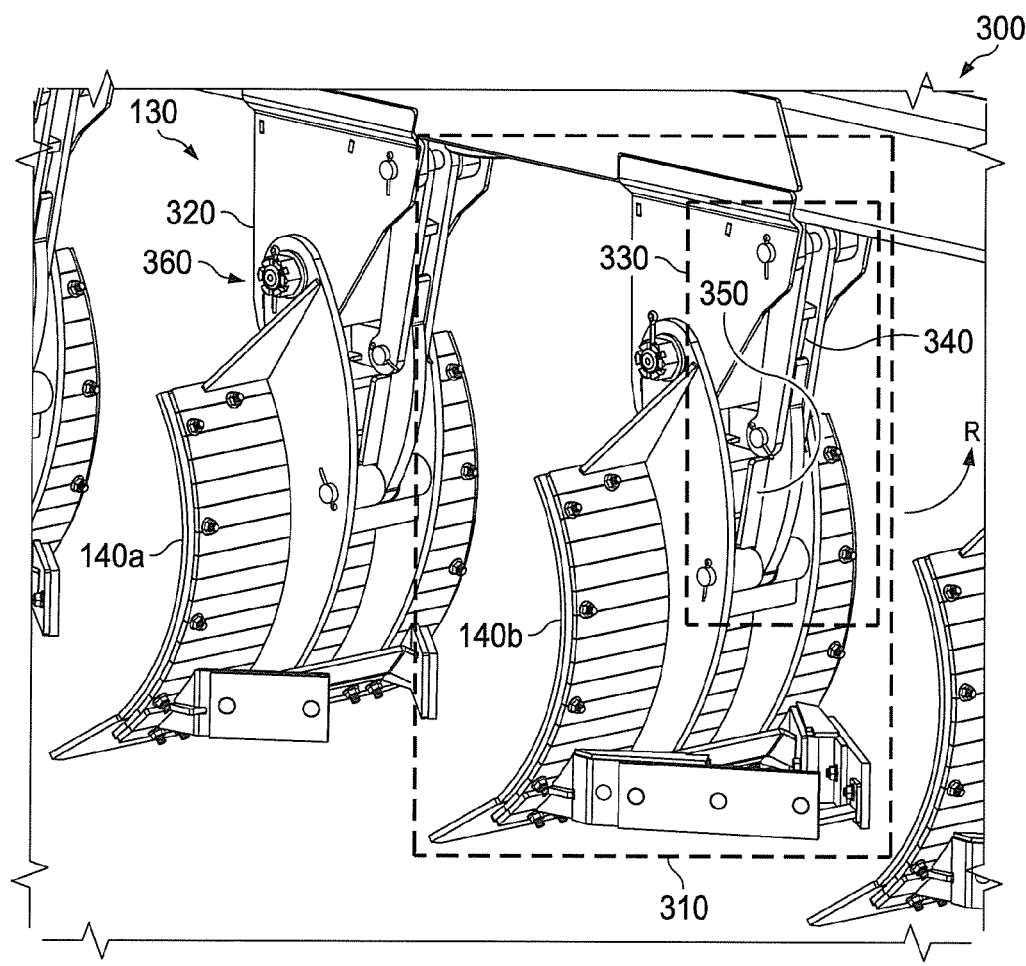
FIG. 3 illustrates a solid view of a portion of the plow assembly focused on the back side of a plow bottom according to embodiments of the present disclosure.

FIG. 3 illustrates a solid back view 300 of a portion of the plow assembly 100 focused on the plow bottom 130 in an initial configuration 310 according to embodiments of the present disclosure. The plow bottom 130 includes a shank holder 320, a shank 140, and a trip mechanism 330. The trip mechanism 330 includes a swivel 340, a shank stop 350, a connection 360, a spring 710 and a bolt 1050. The spring 710 and bolt 1050 are not visible is FIG. 3, but are discussed in below with reference to FIGS. 7A-7C and FIGS. 10A-10C. The shank holder 320 is coupled to the bottom of the boom 120 and rotably coupled with the top of the shank 140 and the swivel 340. The swivel 340 is rotably coupled to the shank holder 320 at one end and rotably coupled to the shank stop 350 at the opposite end. Along with being rotably coupled to the swivel 340, the shank stop 350 is rotably coupled at the opposite end to the shank 140. The shank 140 is also rotably coupled to the shank holder 320. The spring 710 is connected to the shank holder 320 and the swivel 340. The bolt 1050 is inserted through a via 1060 (illustrated if FIG. 10) in the swivel 340.

The plow bottom 130 is configured to disengage upon the shank 140 striking a rock or other hard object in the soil. The bolt 1050 is used as an adjustable switch 1040 to change the threshold force 1070 required for the plow bottom 130 to disengage. That is, by protruding the bolt 1050 through the swivel 340, the threshold force 1070 required can be changed.

Before the bolt 1050 protrudes through the swivel 340, the shank stop 350 is in a locked position and the shank 140 will not disengage at any force. As the bolt 1050 protrudes further through the swivel 340, the end of the shank stop 350 is nudged away from the swivel 340. Protruding the bolt 1050 allows rotation between the shank stop 350 and the swivel 340. When the shank 140 strikes a rock or another object, the shank 140 rotates in the direction of the arrow about the connection 360 with the shank holder 320. For example, a rotation of the shank 140a causes to back of the shank 140a to move closer to the front of the shank 140b while the bottom edge of the shank 140a rises up and out of the ground. The shank stop 350 and the swivel 340 also rotate with the shank 140 in the same direction of arrow "R" causing a spring 710 to stretch. In another embodiment, the disengagement of the plow bottom 130 may automatically generate a signal to notify the plow operator through an alarm or some other form of notification.

Once the plow bottom 130 disengages, the plow operator may operate the tractor to lift the plow assembly 100 causing the shank 140 to be lifted out of the ground. Once the shank 140 is free from the ground, the plow bottom 130 reengages. In certain embodiments, a combination of gravity and the spring 710 act together to reengage the plow bottom 130, but the plow bottom 130 can be reengaged by any other suitable means.

Figure 4:
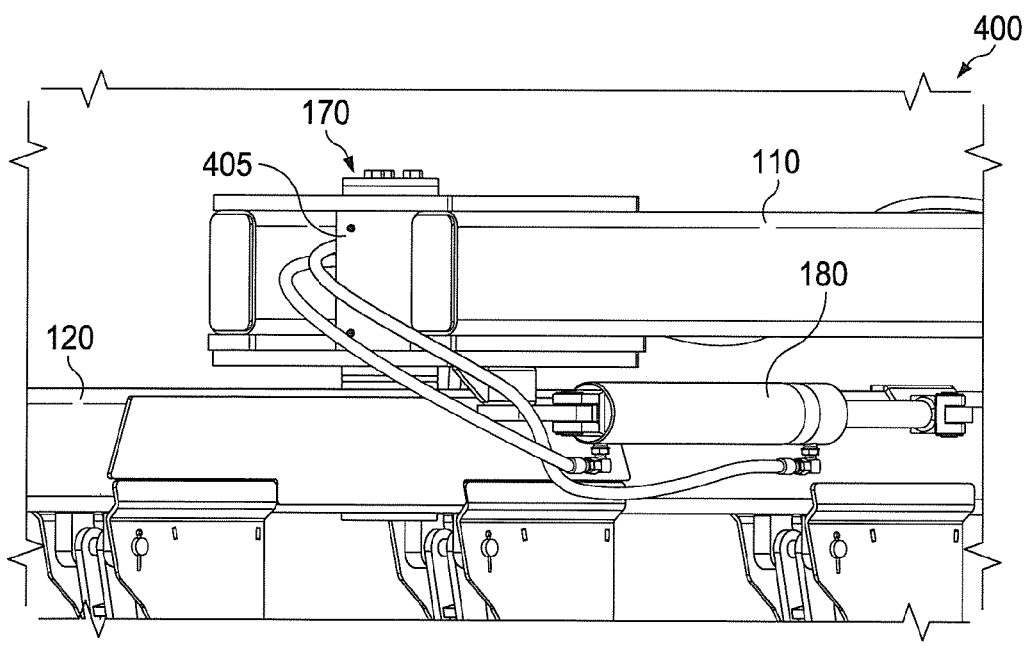
FIG. 4 illustrates a solid view of a portion of the plow assembly focused on the swivel connection rotably coupling the boom to the A-frame according to embodiments of the present disclosure.

FIG. 4 illustrates a solid view 400 of a portion of the plow assembly 100 focusing on the swivel connection 170 of the boom 120 connecting to the A-frame 110 according to embodiments of the present disclosure. The swivel connection 170 connects the boom 120 to the A-frame 110. The swivel connection 170 includes a male portion 405 and a female portion 410 (shown in FIG. 5A). The male portion 405 is a cylinder that slidably couples within the via of the female portion 410. In the example shown, the A-frame 110 includes the female portion 410 of the swivel connection 170. The swivel connection 170 allows the boom 120 to rotate. Rotation is controlled by an actuator 180, but may be controlled by any suitable means known to one skilled in the art. Rotating the boom 120 allows the operator to align the plow bottoms 130 in order to control the direction which the soil is turned over. As the plow assembly 100 is pulled across the field, the plow bottoms 130 or shanks 140 are not parallel to the back of the tractor, but are disposed at a slight angle. When the tractor reaches an end of the field and turns around, the operator may activate the actuator 180 from the tractor cab to rotate the boom 120 to maintain a similar angle in the soil as the tractor drives toward the opposite end of the field.

FIGS. 5A through 5D illustrate an A-frame 110 according to embodiments of the present disclosure. More particularly, FIGS. 5A through 5D illustrate the A-frame 110 of FIG. 1. The A-frame 110 acts as a support for the other components of the plow assembly 100. The tractor uses the A-frame 110 to raise and lower the entire plow assembly 100 in order for the plow bottoms 130 to be reset. Also, as a non-limiting example, the tractor can raise the plow assembly 100 to transport the plow assembly 100 to a storage location (e.g., barn) without plowing the land along the route to the storage location. The tractor can lower the plow assembly 100 to begin plowing the land (e.g., crop rows).

Figure 5A:
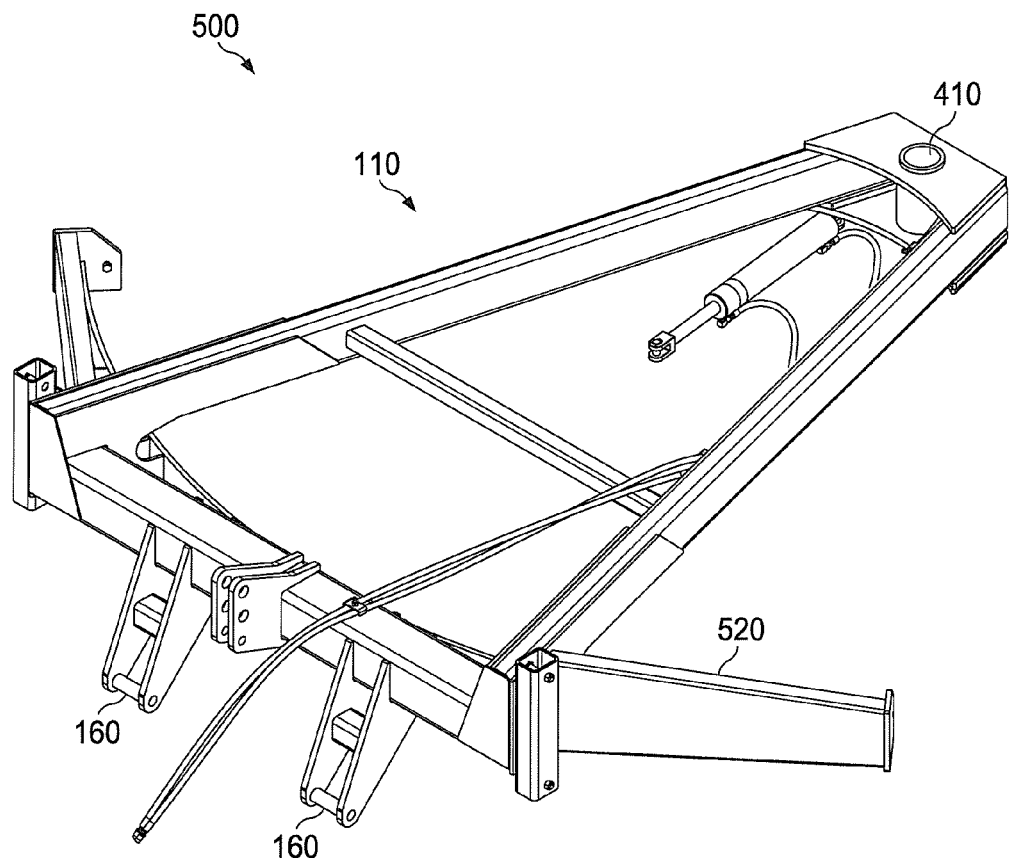
FIGS. 5A through 5D illustrate an A-frame according to embodiments of the present disclosure.

FIG. 5A illustrates a solid view 500 of the A-frame 110 according to embodiments of the present disclosure. The embodiment of the A-frame 110 shown in FIG. 5A is for illustration only. Other embodiments could be used without departing from the scope of this disclosure. In the particular example shown, the A-frame 110 includes two tractor connections 160, which are used to mount the plow assembly 100 to the back of a tractor. The A-frame 110 also includes two wings 510 that limit the rotation of the boom 120. For example, the front end of the boom 120 is disposed between the two wings 510 and can rotate to an angle to physically contact one wing 510. The front end of the boom 120 can be rotated to a different angle to physically contact the other wing 510 of the A-frame 110.

Figure 5B:
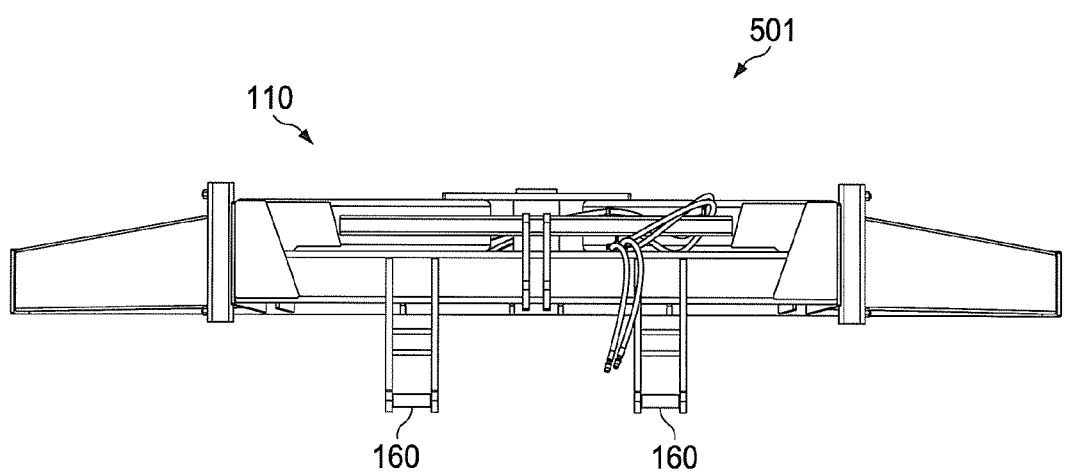

FIG. 5B illustrates a solid front view 501 of the A-frame 110 of FIG. 5A according to embodiments of the present disclosure.

Figure 5C:
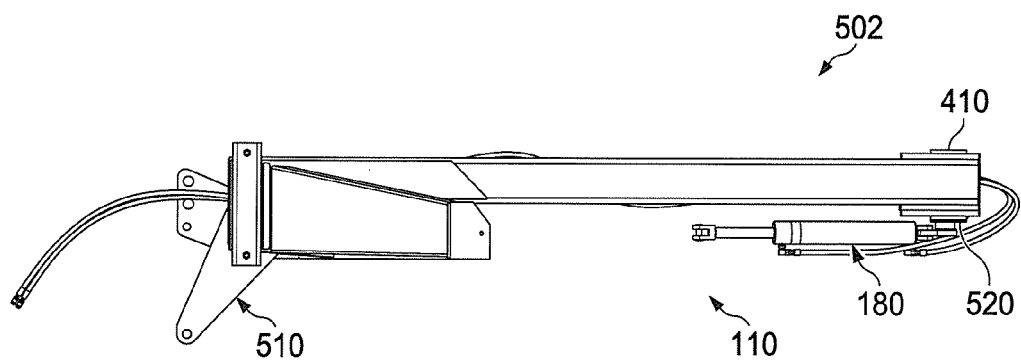

FIG. 5C illustrates a wire side view 502 of the A-frame 110 of FIG. 5A. An actuator bracket 520 at the end of the A-frame 110, next to the swivel connection 170, connects the actuator 180 to the A-frame 110.

Figure 5D:
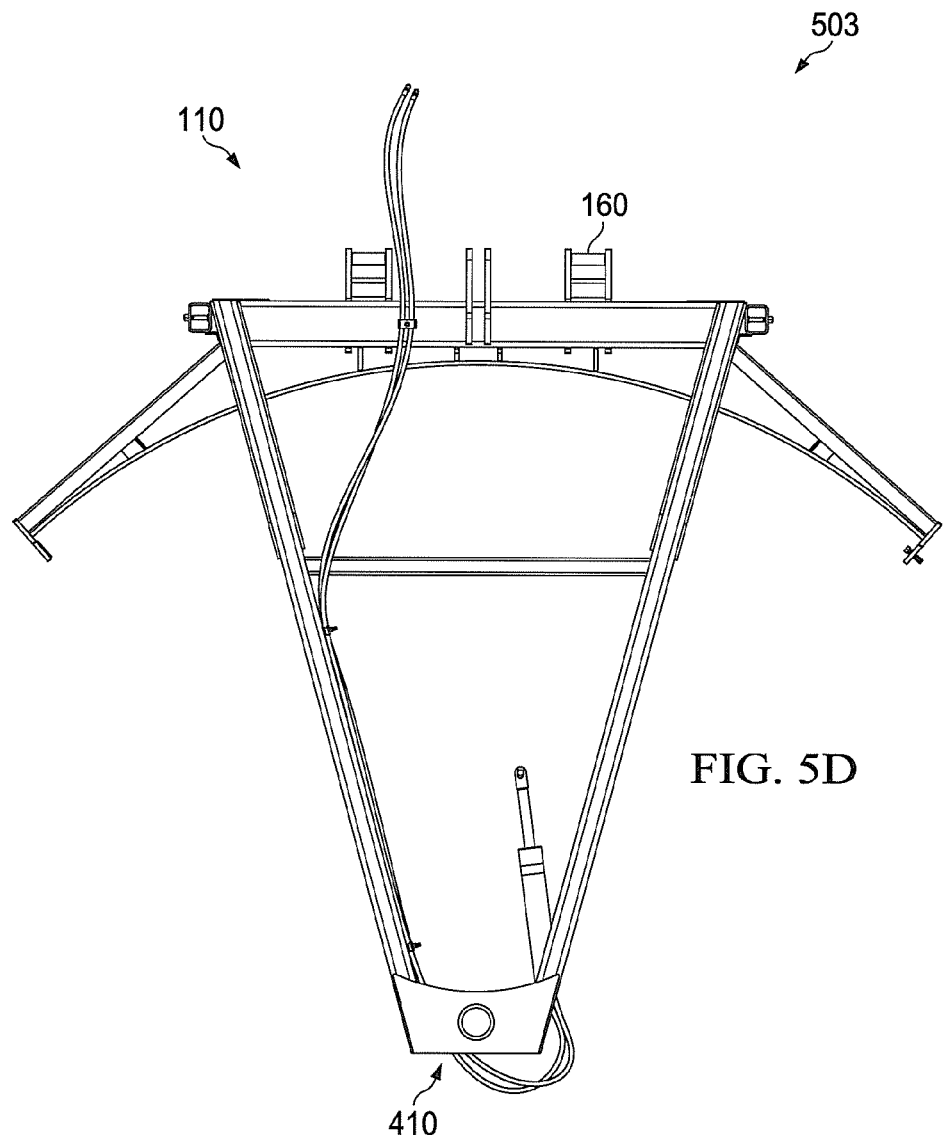

FIG. 5D illustrates a wire top view 503 of the A-frame 110 of FIG. 5A.

Figure 6A:
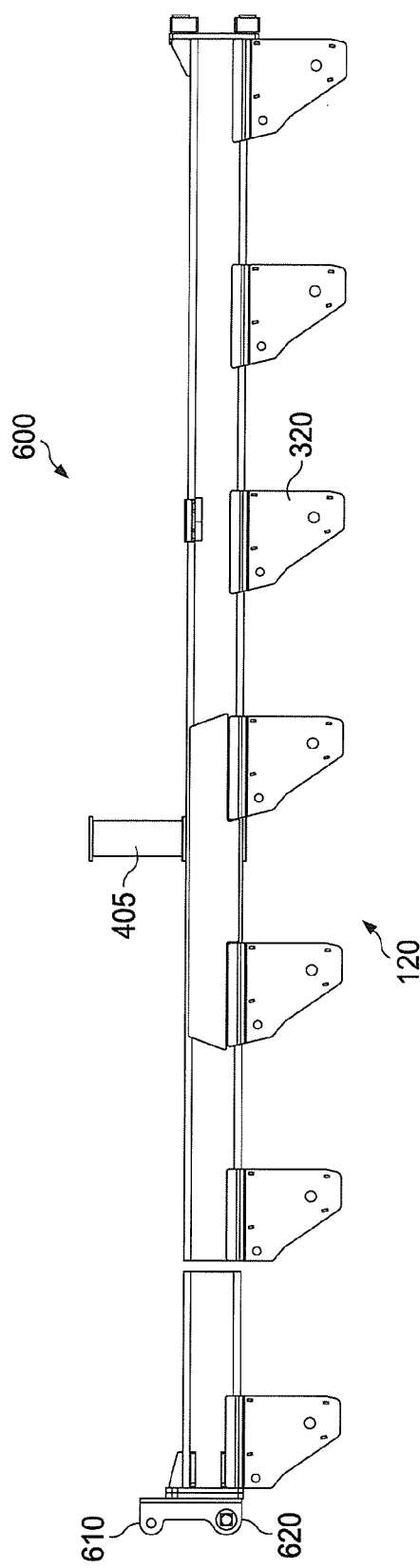
FIGS. 6A through 6C illustrate a boom according to embodiments of the present disclosure.
Figure 6B:
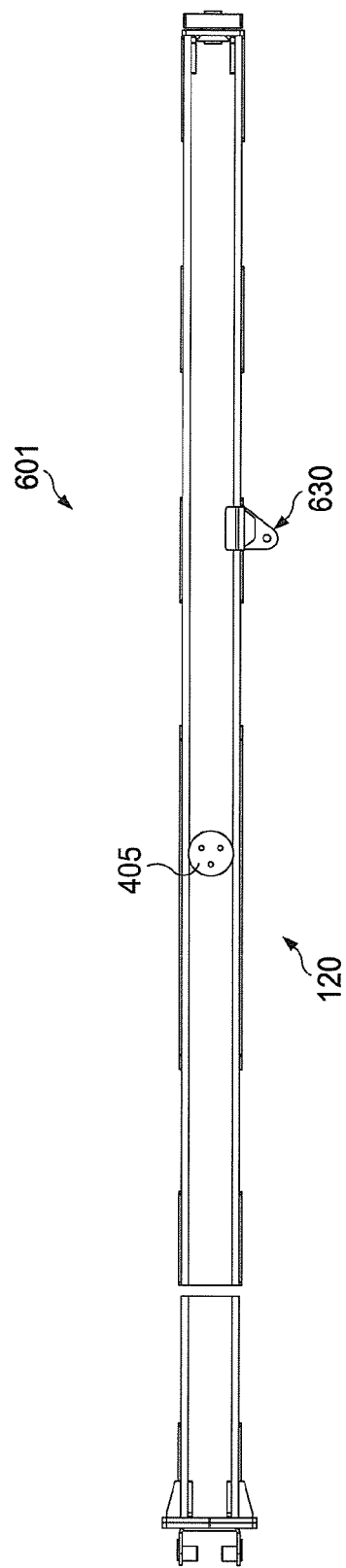
Figure 6C:
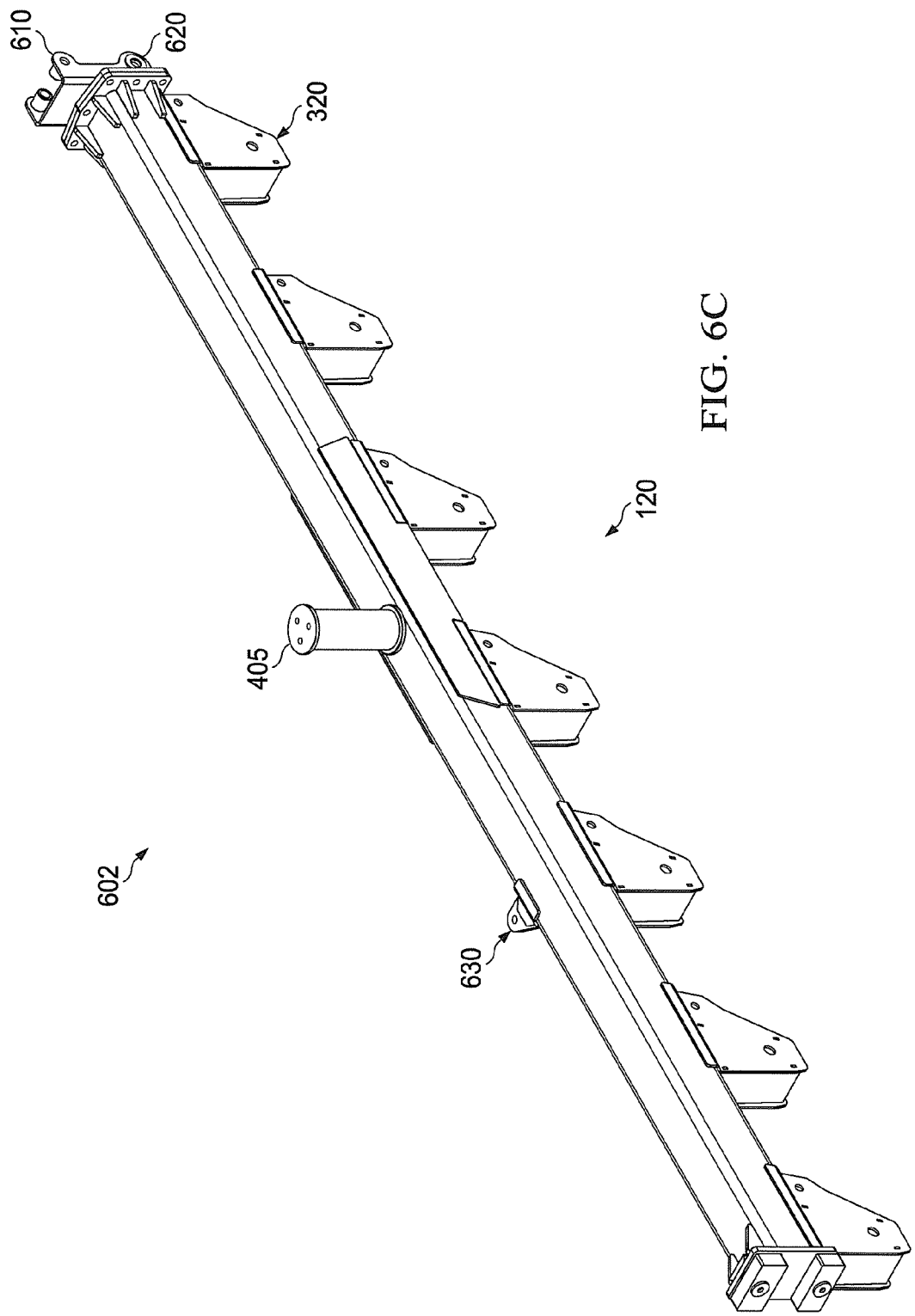

FIGS. 6A through 6C illustrate the boom 120 of FIG. 1 according to embodiments of the present disclosure. The boom 120 structurally supports and aligns the plow bottoms 130. For example, the plow bottoms 130 are mounted to the boom 120. In certain embodiments, the boom 120 is composed of a strong metal, such as an 8 inch square steel tube. The swivel connection 170 is located on the top at the center of the boom 120. In the example shown, the boom 120 includes the male portion 405 of the swivel connection 170. At the back end of the boom 120 are two connections (top connection 610 and bottom connection 620) for the gage wheel assembly 150. The top connection 610 aligns with and mechanically couples to one of the connectors 1310 (illustrated in FIG. 13) of the turn buckle 1120 (illustrated in FIG. 11) and the horizontal hole 1230 (illustrated is FIG. 12 of the gage wheel tubing 1110 (illustrated in FIG. 11). The shank holders 320 are evenly spaced and connected to the bottom of the boom 120. An actuator bracket 630 is provided for connection of the actuator 180 with the boom 120.

FIG. 6A illustrates a wire side view 600 of a boom 120 according to embodiments of the present disclosure.

FIG. 6B illustrates a wire top view 601 of the boom 120 of FIG. 6A according to embodiments of the present disclosure.

FIG. 6C illustrates a solid view 602 of the boom 120 of FIG. 6A according to embodiments of the present disclosure.

Figure 7C:
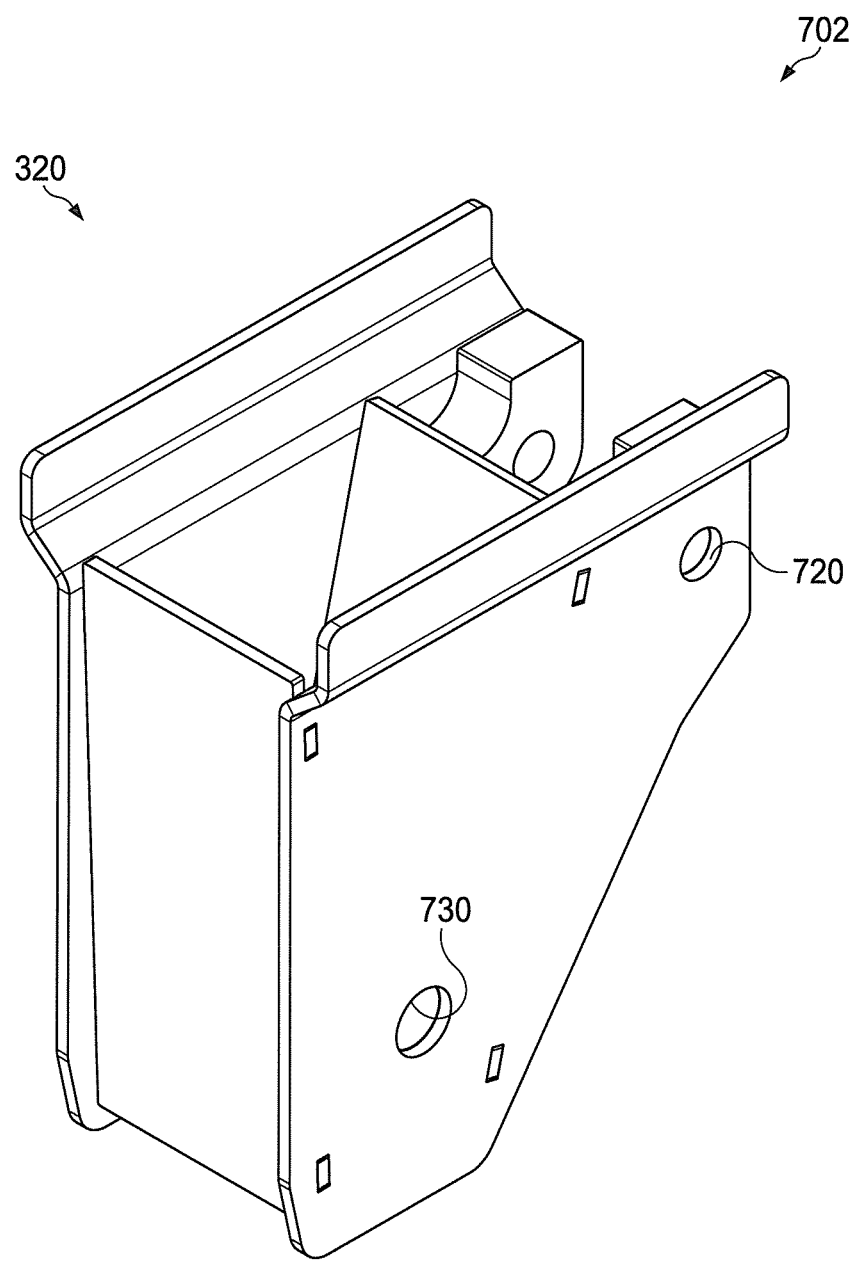

FIGS. 7A through 7C illustrate the shank holder 320 according to embodiments of the present disclosure. The shank holder 320 includes a spring 710. The spring 710 is used to assist reengaging the shank 140 after a rock is struck by the shank 140. The spring 710 is attached to the shank holder 320 by a spring bracket 740. A top set of holes 720 located on the sides of the shank holder 320 align with and mechanically couple to the top set of holes 1010 (illustrated in FIGS. 10A-10C) of the swivel 340. A bottom set of holes 730 located on the sides of the shank holder 320 aligns with and mechanically couples to the holes 830 (illustrated in FIGS. 8A-8D) of the shank 140.

FIG. 7A illustrates a wire side view 700 of the shank holder 320 according to embodiments of the present disclosure.

FIG. 7B illustrates a wire front view 701 of the shank holder 320 according to embodiments of the present disclosure.

FIG. 7C illustrates a solid view 702 of the shank holder 320 according to embodiments of the present disclosure.

FIGS. 8A through 8D illustrate a shank 140 according to the embodiments of the present disclosure. The shank 140 has a curved metal plate 810 used to turn the soil over. As the tractor pulls the plow assembly 100, a lower portion of the shank 140 is forced beneath the top surface of the soil. The combination of the angle and curve of the curved metal plate 810 of the shank 140 causes subsurface soil to lift and roll on top of the surface soil. That is, the surface soil is buried under the subsurface soil, instead of merely displacing the soil to shift aside the shank 140. The shank 140 has two flat support plates 820 which are mounted to the back of the curved metal plate 810. At the top of each support plate 820 is a hole 830 which aligns with and mechanically couple to the bottom set of holes 730 of the shank holder 320. Two tubes 840 are mounted on the inside walls of the support plates 820. These tubes 840 align with and mechanically couple to the bottom hole 910 (illustrated in FIG. 9) of the shank stop 350.

FIG. 8A illustrates a solid view 800 of the shank 140 according to embodiments of the present disclosure.

FIG. 8B illustrates a solid bottom view 801 of the shank 140 according to embodiments of the present disclosure.

FIG. 8C illustrates a wire side view 802 of the shank 140 according to embodiments of the present disclosure.

FIG. 8D illustrates a wire back view 803 of the shank 140 according to embodiments of the present disclosure.

Figure 9A:
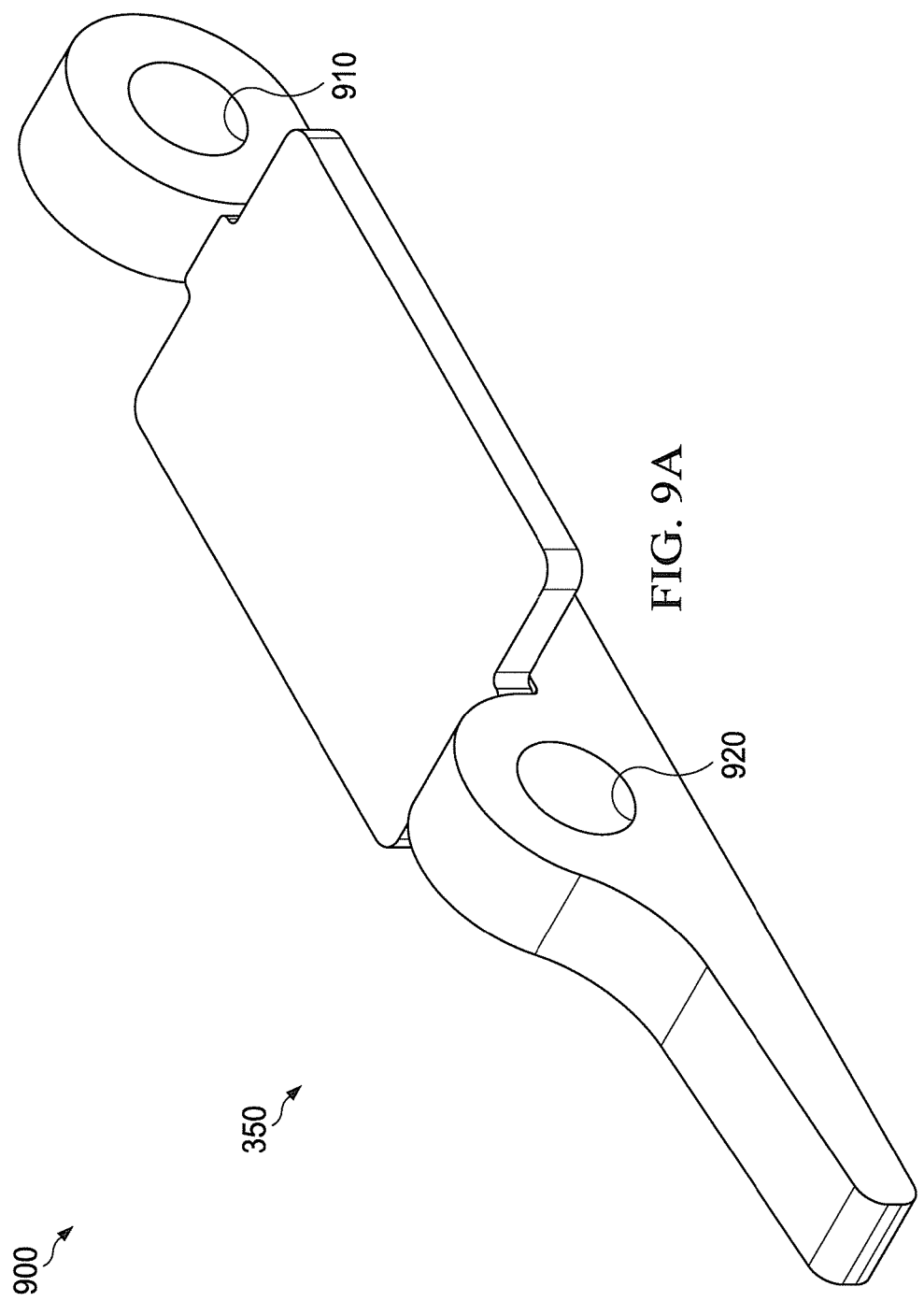

FIGS. 9A through 9C illustrate the shank stop 350 according to the embodiments of the present disclosure. The shank stop 350 includes a bottom hole 910 located at a lower end for aligning with and mechanically coupling to the tubes 840 of the shank 140 and a top hole 920 for aligning with and mechanically coupling to the bottom set of holes 1020 (illustrated in FIG. 10) of the swivel 340. That is, a portion of the tube 840 is received through the bottom hole 910 to rotably couple the shank stop 350 to the shank 140. Similarly, the top hole 920 of the shank stop 350 aligns with and mechanically couples to a bottom set of holes 1020 (illustrated in FIGS. 10A-10C) of the swivel 340, such as with a mechanical fastener (e.g., a bolt) through the aligned holes.

FIG. 9A illustrates a solid view 900 of the shank stop 350 according to embodiments of the present disclosure.

FIG. 9B illustrates a wire top view 901 of the shank stop 350 according to embodiments of the present disclosure.

FIG. 9C illustrates a wire side view 902 of the shank stop 350 according to embodiments of the present disclosure.

Figure 10A:
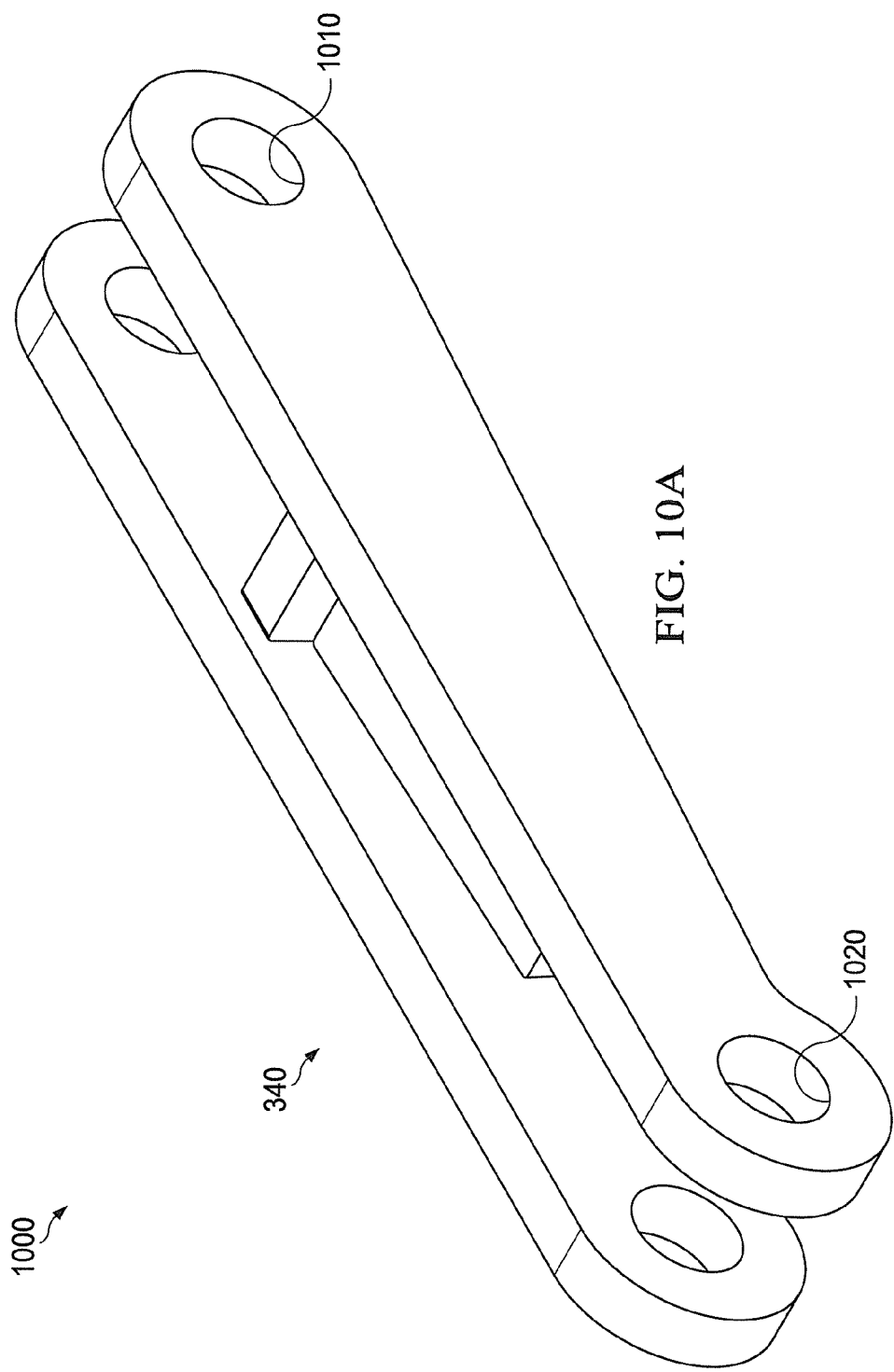
FIGS. 10A through 10C illustrate a swivel according to embodiments of the present disclosure.
Figures 10B, 10C:
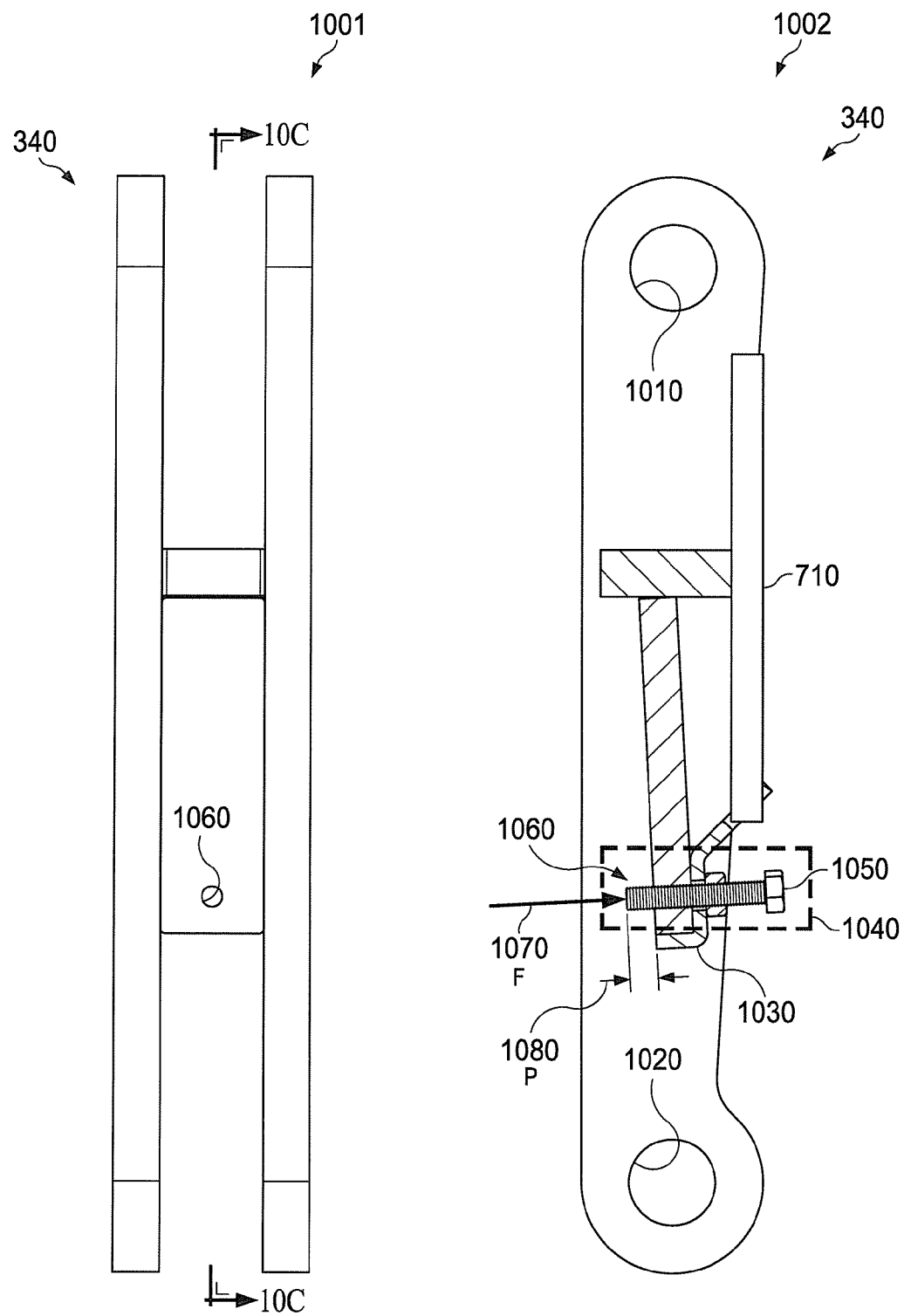

FIGS. 10A through 10C illustrate the swivel 340 according to embodiments of the present disclosure. The swivel 340 includes a top set of holes 1010 for aligning with and mechanically coupling with the top set of holes 720 of the shank holder 320, a bottom set of holes 1020 for aligning with and mechanically coupling with the top hole 920 of the shank stop 350, a bracket 1030, and an adjustable switch 1040. The adjustable switch 1040 includes a via 1060, located on the swivel 340, in which a bolt 1050 is inserted. The bolt 1050 is used to determine the threshold force "F" 1070 required for the shank 140 to disengage. The protrusion "P" 1080 of the bolt 1050, through the via 1060 past the swivel 340, sets the threshold force 1070 required for activating the trip mechanism 330. The threshold force 1070 is an amount of force applied in the direction against the bolt 1050. The threshold force 1070 decreases the further the bolt 1050 protrudes beyond the exit side (that is, the front side) of the via 1060 of the swivel 340. If the bolt 1050 does not protrude through the exit side of the via 1060, the shank stop 350 is in a locked position, and the plow bottom 130 will not disengage unless a damage-causing force is applied to the shank 140.

The swivel 340 also includes a bracket 1030 to which the spring 710 is connected. When the shank 140 disengages, the spring 710 stretches. When the tractor lifts the plow assembly 100, the spring 710 contracts, pulling the shank 140, effectively resetting the plow bottom 130.

FIG. 10A illustrates a solid view 1000 of the swivel 340 according to embodiments of the present disclosure.

FIG. 10B illustrates a wire top view 1001 of the swivel 340 according to embodiments of the present disclosure.

FIG. 10C illustrates a wire side view 1002 of the swivel 340 according to embodiments of the present disclosure.

Figure 11:
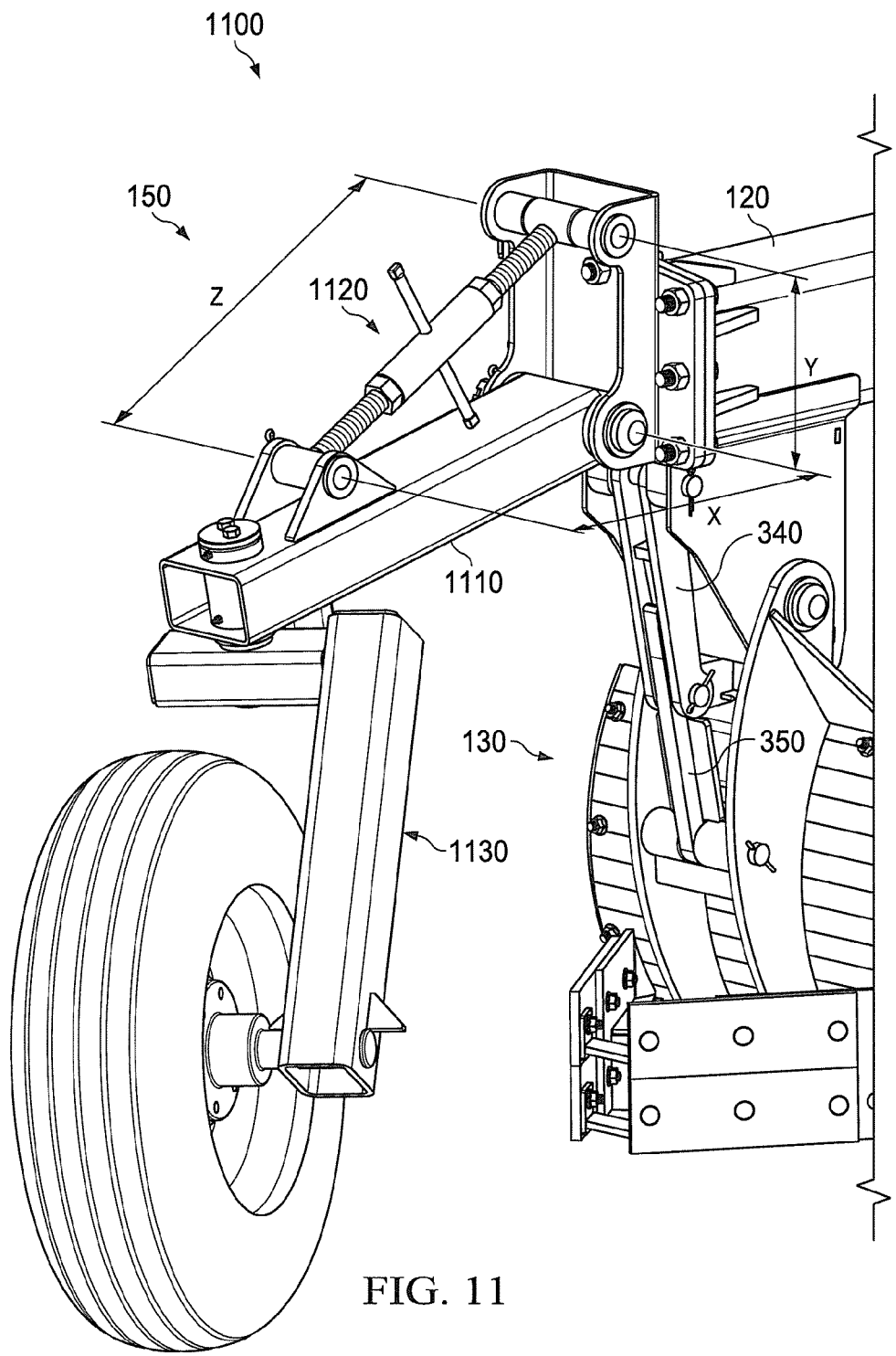
FIG. 11 illustrates a solid view of a portion of the plow assembly focused on the gage wheel assembly according to embodiments of the present disclosure.

FIG. 11 illustrates a solid view 1100 of a portion of the plow assembly 100 focused on the gage wheel assembly 150 according to the embodiments of the present disclosure. The gage wheel assembly 150 includes gage wheel tubing 1110, a turn buckle 1120, and a gage wheel mount 1130. The gage wheel assembly 150 is used to keep the boom 120 parallel to the ground. The turn buckle 1120 is adjusted to raise or lower the back end of the boom 120 in combination with the gage wheel tubing 1110. The gage wheel mount 1130 is connected to the gage wheel tubing 1110 and used to mount a wheel (not shown).

Figure 12A:
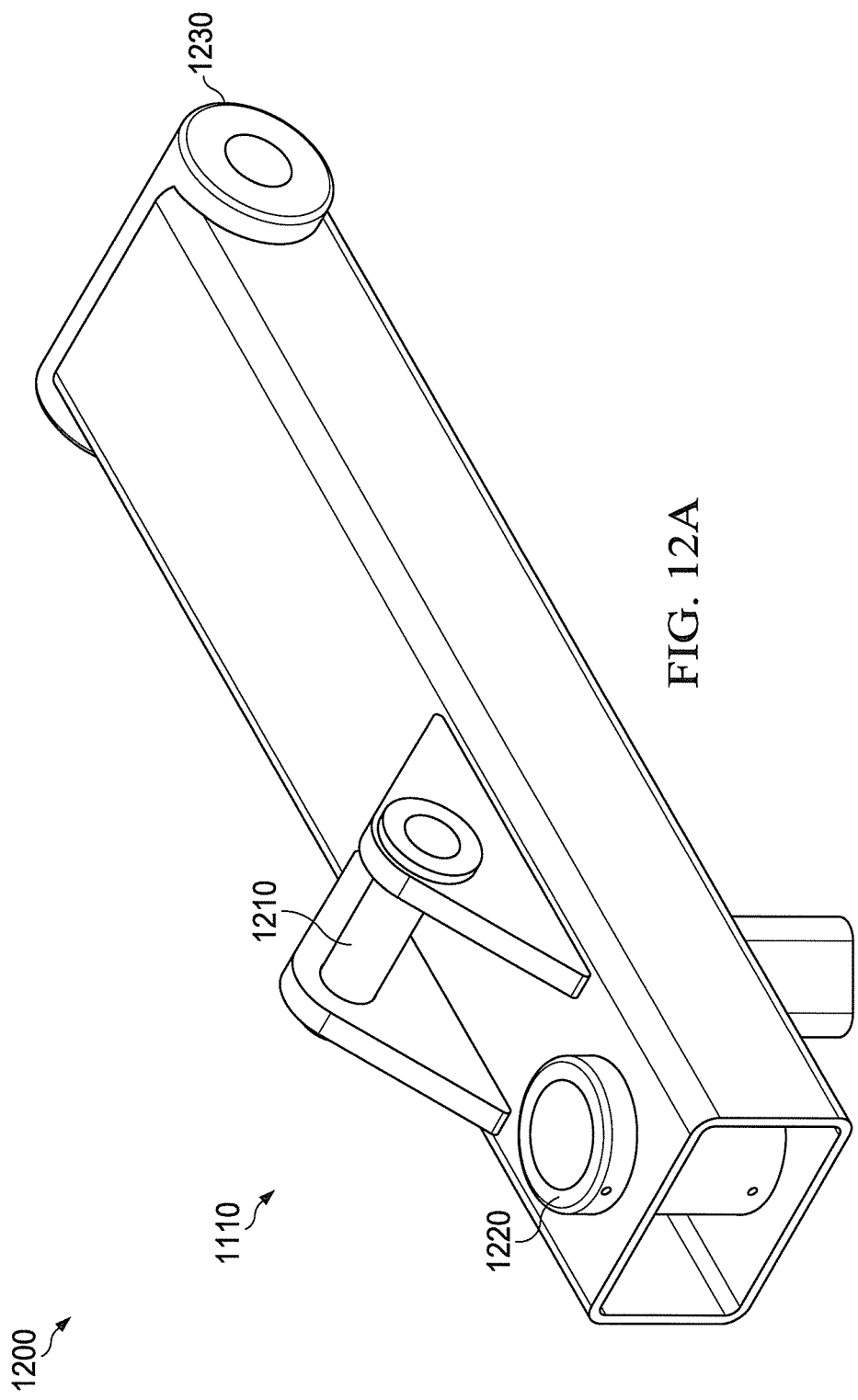
FIGS. 12A through 12C illustrate a gage wheel tubing according to embodiments of the present disclosure.
Figure 12B:
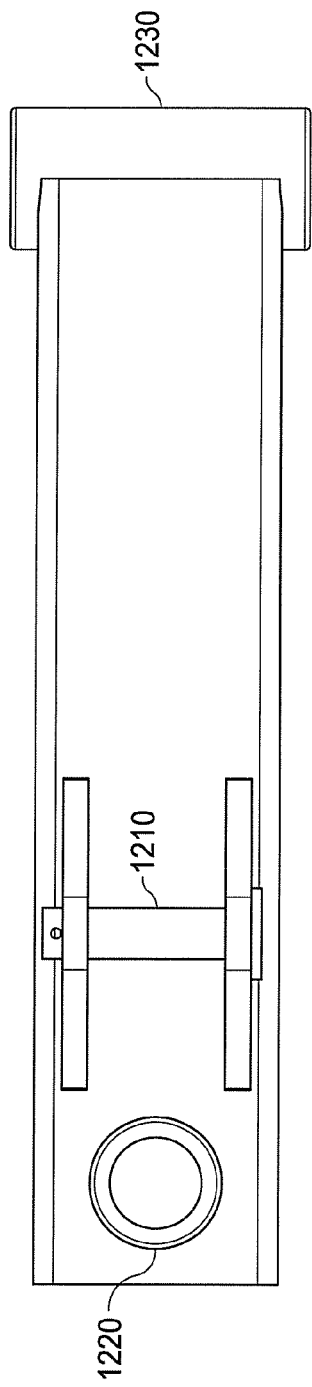
Figure 12C:
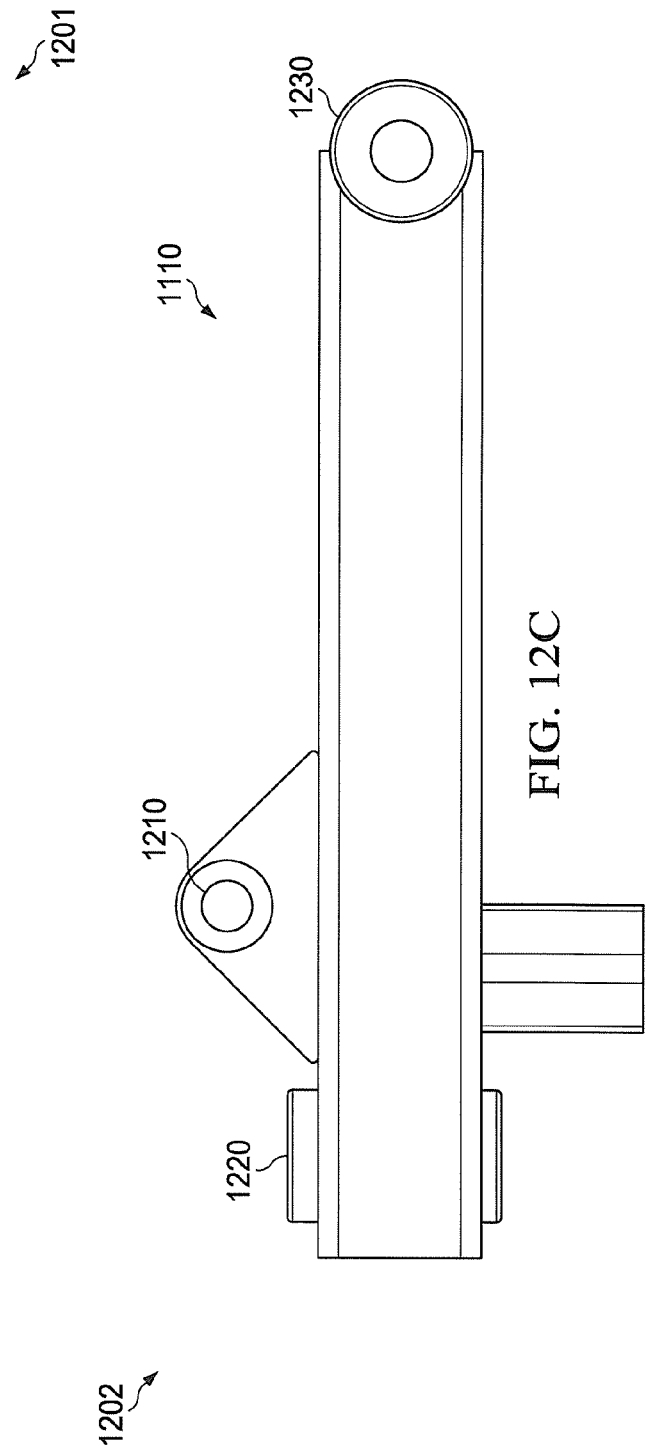

FIGS. 12A through 12C illustrate the gage wheel tubing 1110 according to the embodiments of the present disclosure. The gage wheel tubing 1110 has a mount 1210 on a top surface that aligns with and mechanically couples to one of the connectors 1310 (illustrated in FIG. 13) of the turn buckle 1120. The gage wheel tubing 1110 also includes a substantially-vertical hole 1220 at a rear end and a substantially-horizontal hole 1230 at the opposite front end. The vertical hole 1220 is used to align with and mechanically couple with the connection cylinder 1410 (illustrated in FIG. 14) of the gage wheel mount 1130 to the gage wheel tubing 1110. The horizontal hole 1230 of the gage wheel tubing 1110 aligns with and mechanically couple to the bottom connection 620 at the back end of the boom 120. Because the distance "Y," between the top connection 610 and the bottom connection 620 of the boom 120, and the distance "X," between horizontal hole 1230 and the mount 1210 of the gage wheel tubing 1110 are fixed, extending the length "Z" of the turn buckle 1120 increases the height at the end of the boom 120. Alternatively, reducing the length "Z" of the turn buckle 1120 decreases the height at the end of the boom 120.

FIG. 12A illustrates a solid view 1200 of the gage wheel tubing 1110 according to embodiments of the present disclosure.

FIG. 12B illustrates a wire top view 1201 of the gage wheel tubing 1110 according to embodiments of the present disclosure.

FIG. 12C illustrates a wire side view 1202 of the gage wheel tubing 1110 according to embodiments of the present disclosure.

Figure 13A:
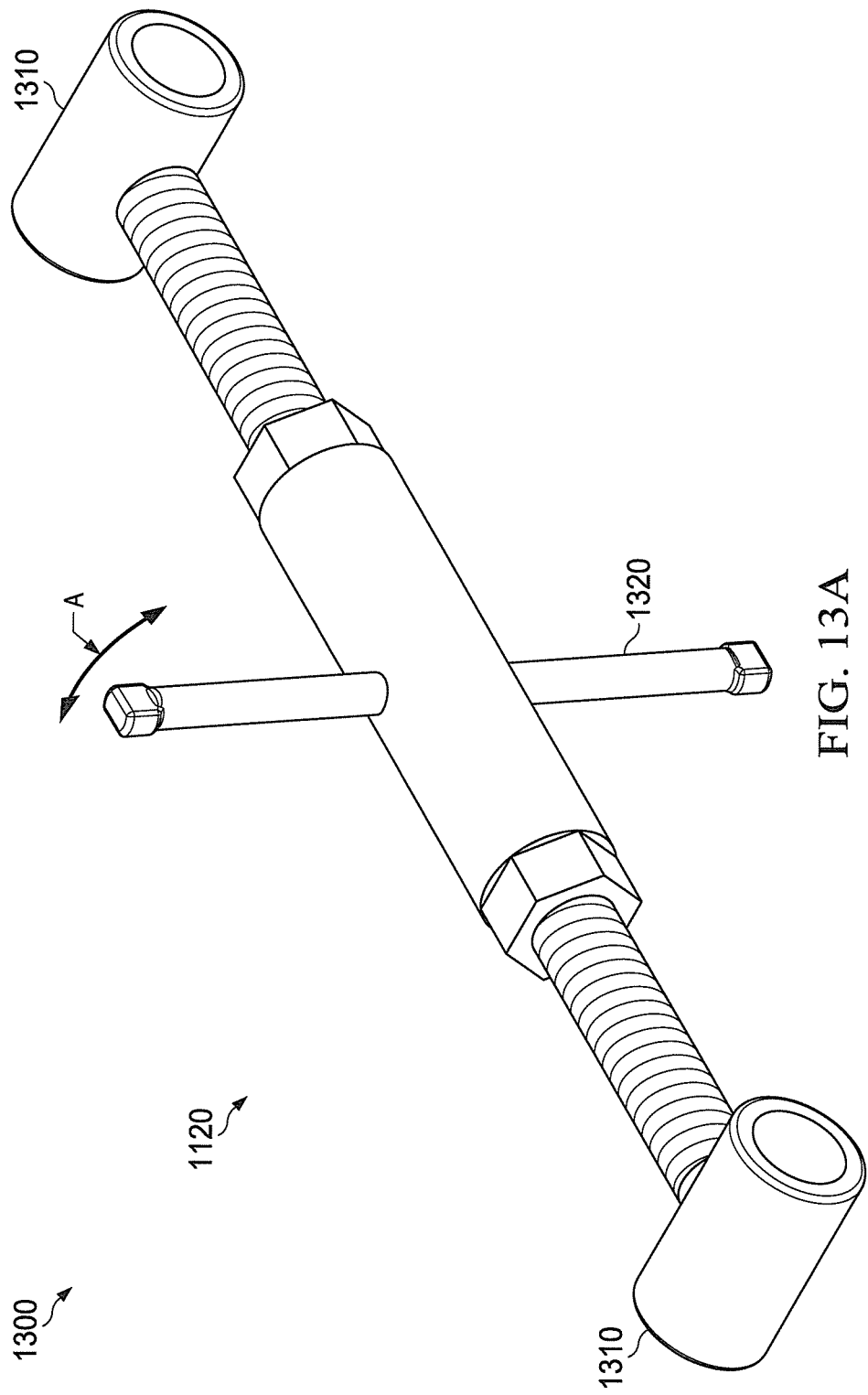

FIGS. 13A through 13C illustrate the turn buckle 1120 according to the embodiments of the present disclosure. The turn buckle 1120 is provided to keep the boom 120 level with the ground to keep all of the shanks 140 at the same depth. A screw rod 1320 is used to determine the overall length of the turn buckle 1120. Rotating the screw rod 1320 in the direction of the arrow "A" will cause the turn buckle 1120 to extend or contract. The turn buckle 1120 has similar connectors 1310 at both ends. One connector 1310 of the turn buckle 1120 aligns with and mechanically couples to the mount 1210 on the gage wheel tubing 1110 and the other connector 1310 aligns with and mechanically couples to the top connection 610 of the boom 120.

FIG. 13A illustrates a solid view 1300 of the turn buckle 1120 according to embodiments of the present disclosure.

FIG. 13B illustrates a wire top view 1301 of the turn buckle 1120 according to embodiments of the present disclosure.

FIG. 13C illustrates a wire side view 1302 of the turn buckle 1120 according to embodiments of the present disclosure.

Figure 14A:
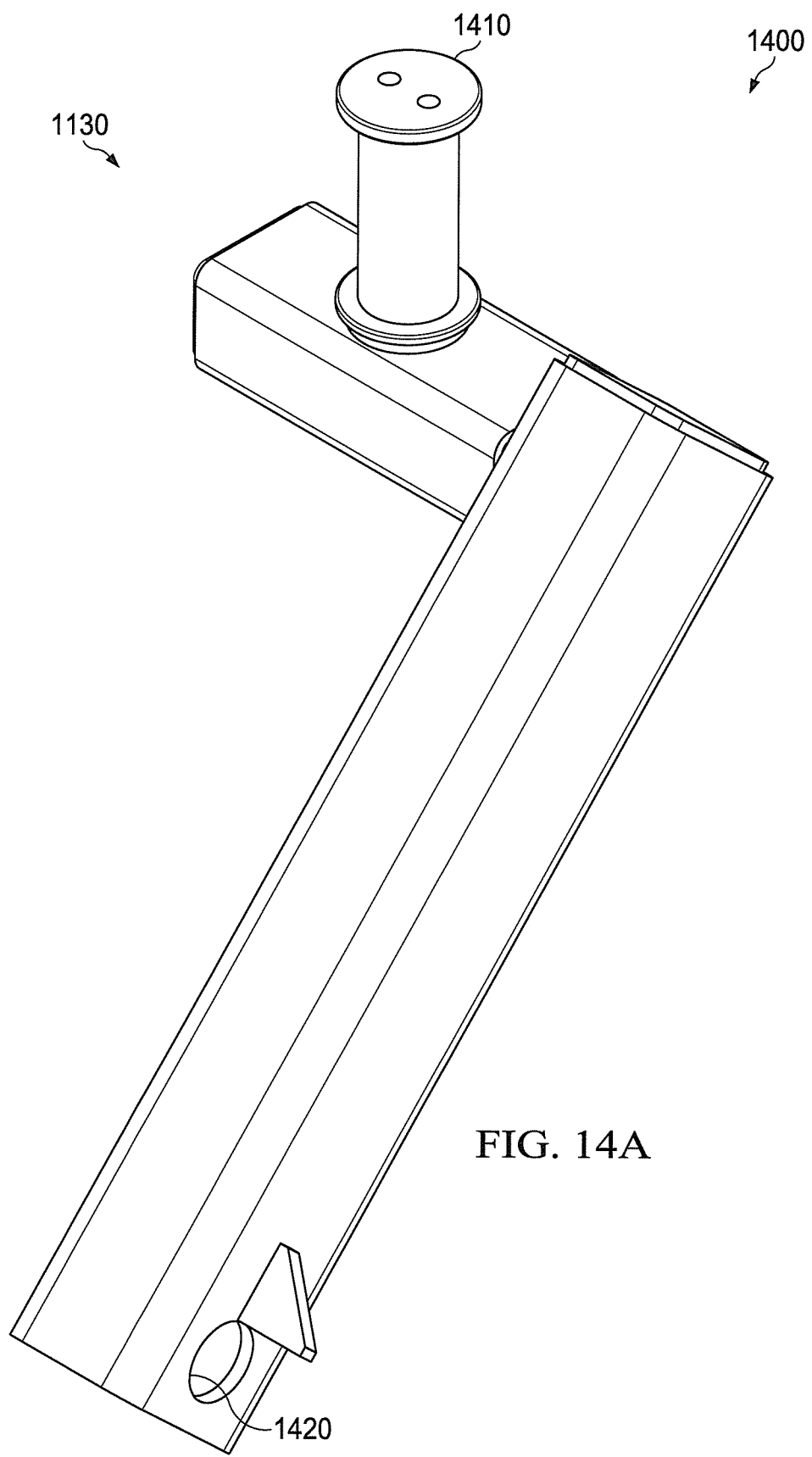
FIGS. 14A through 14C illustrate a gage wheel mount according to embodiments of the present disclosure.
Figure 14C:
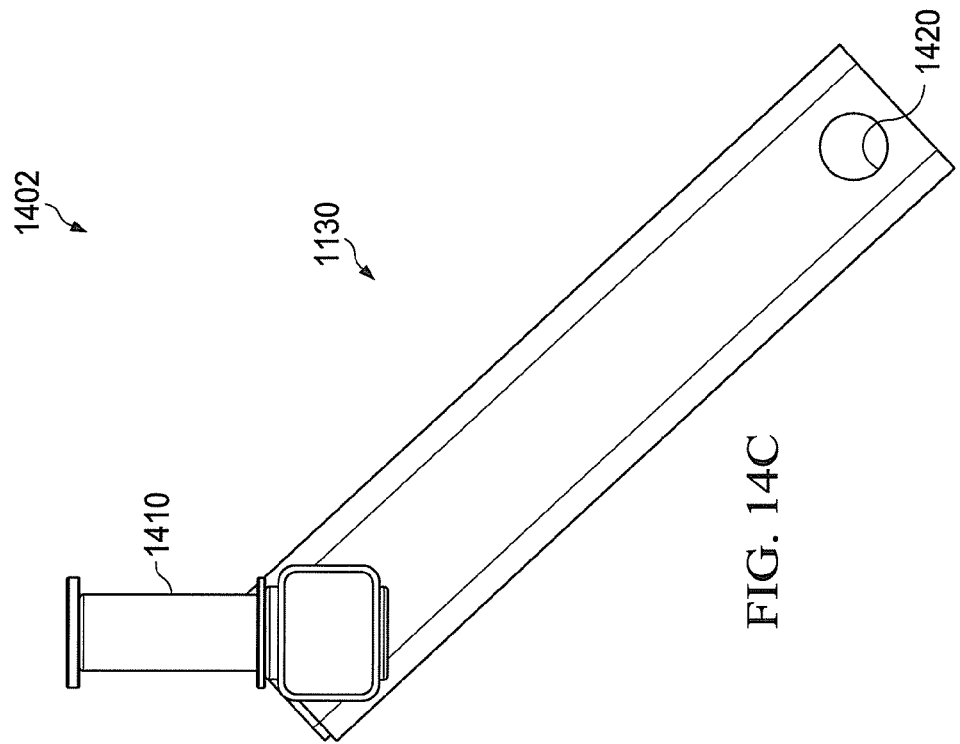
Figure 14B:
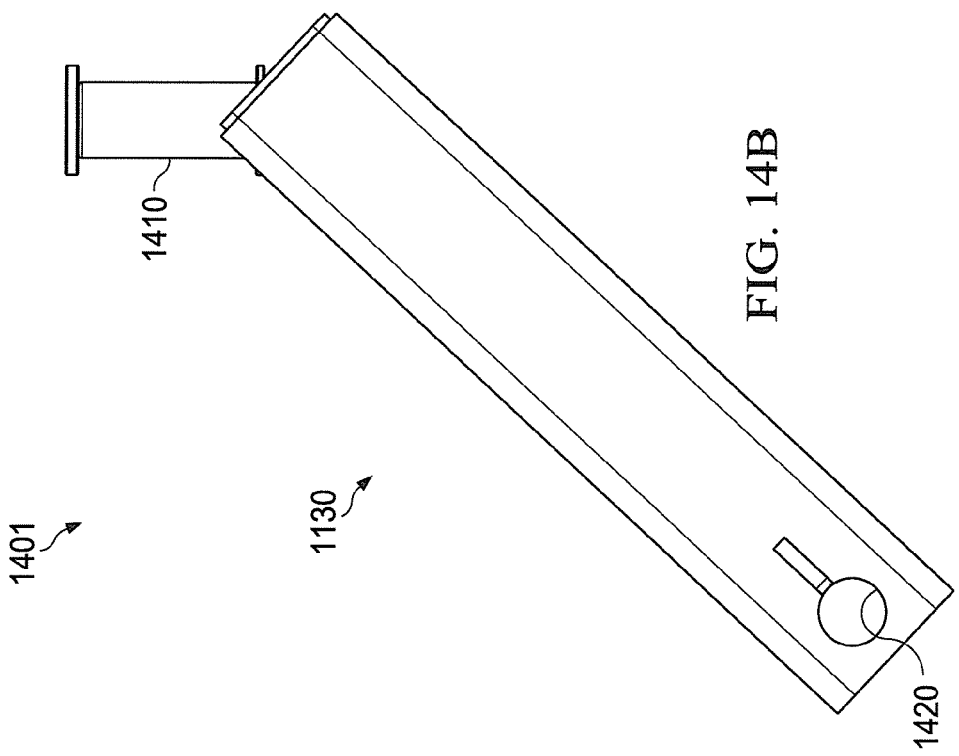

FIGS. 14A through 14C illustrate the gage wheel mount 1130 according to the embodiments of the present disclosure. At the top of the gage wheel mount 1130 is a connection cylinder 1410 which aligns with and mechanically couples to the vertical hole 1220 in the gage wheel tubing 1110. At the opposite end, there is an axle hole 1420 for aligning with and connection of a wheel (not shown).

FIG. 14A illustrates a solid view 1400 of the gage wheel mount 1130 according to embodiments of the present disclosure.

FIG. 14B illustrates a wire back view 1401 of the gage wheel mount 1130 according to embodiments of the present disclosure.

FIG. 14C illustrates a wire front view 1402 of the gage wheel mount 1130 according to embodiments of the present disclosure.

Figure 15:
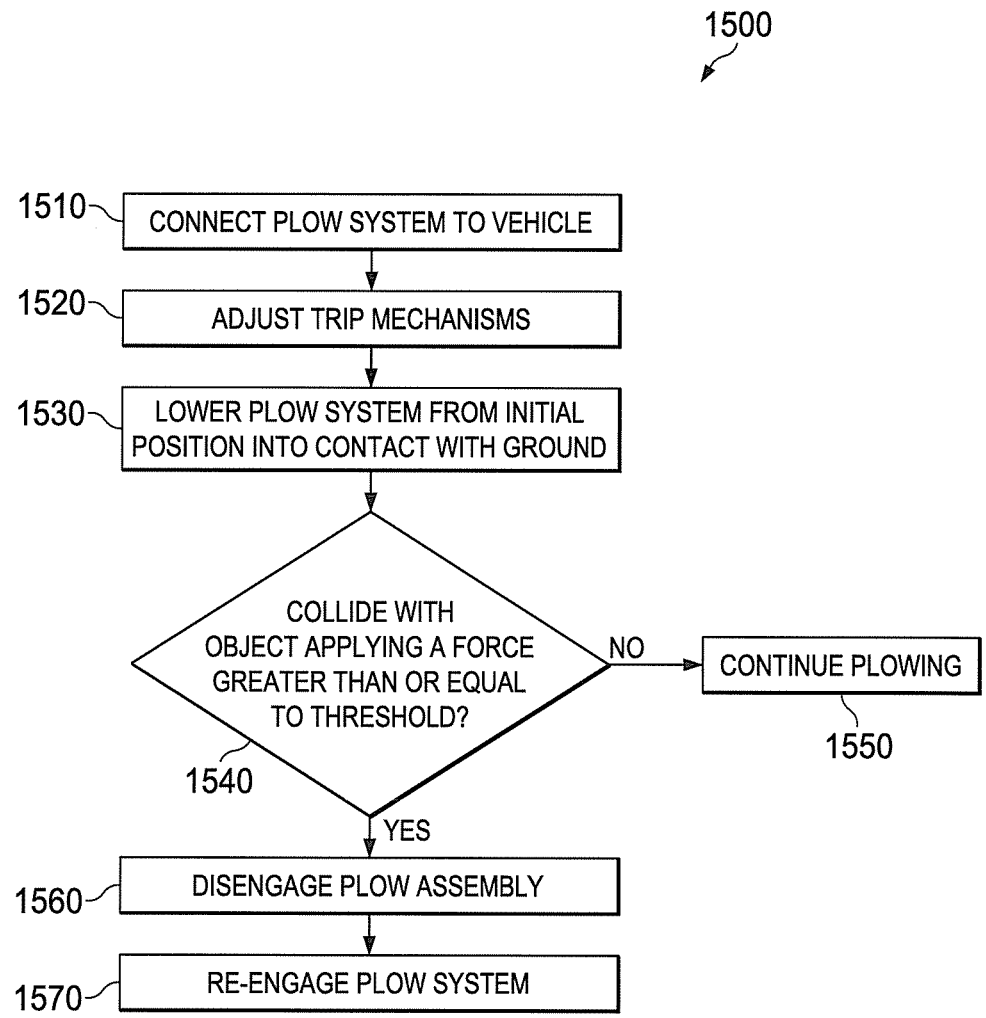
FIG. 15 illustrates a method of operating the plow assembly system according to embodiments of the present disclosure.

FIG. 15 illustrates a method 1500 of operating the plow assembly 100 according to embodiments of the present disclosure. The embodiment of the method 1500 shown in FIGURE is for illustration only. Other embodiments could be used without departing from the scope of this disclosure.

In block 1510, an operator (also referred to as a user) connects the plow assembly 100 to a vehicle, such as a tractor using a mechanical fastener. The tractor connections 160 mechanically couples to the tractor. The turn buckle 1120 may be adjusted to make the boom 120 parallel to the ground. The operator may set the gage wheel assembly 150 for proper height of the end of the A-frame 110 by rotating the screw rod 1320 to adjust the length of the turn buckle 1120. Because the distance between the top connection 610 and the bottom connection 620 of the boom 120, and the distance between horizontal hole 1230 and the mount 1210 of the gage wheel tubing 1110 are fixed, extending the length of the turn buckle 1120 increases the height at the end of the boom 120. Alternatively, reducing the length of the turn buckle decreases the height at the end of the boom 120.

In block 1520, the trip mechanism 330 of each plow bottom 130 is adjusted. The protrusion 1080 of the bolt 1050, through the via 1060 past the swivel 340, sets a threshold force 1070 required for activating the trip mechanism 330. The threshold force 1070 is an amount of force applied in the backward direction against the front curved metal plate 810 of a shank 140. The threshold force 1070 decreases the further the bolt 1050 protrudes beyond the exit side (that is, the front side) of the via 1060 of the swivel 340. If the bolt 1050 does not protrude through the exit side of the via 1060, the shank stop 350 is in a locked position, and the plow bottom 130 will not disengage unless a damage-causing force is applied to the shank 140.

The trip mechanism 330 of the present disclosure allows each plow bottom 130 to have a unique threshold force 1070 compared to the threshold force 1070 of each other plow bottom 130 coupled to the boom 120. That is, the sensitivity of each plow bottom's 130 trip mechanism 330 is set independently from the other plow bottoms 130. As a result, the threshold force 1070 can be set according to operator desires of whether dig up objects or leave the object remaining in the soil. Also as a result, the threshold force 1070 can be set according to operator desires of what mass of object to dig up.

As a non-limiting example, an operator may desire to dig up rocks having a weight of up to 1 kilogram (or other specified weight) in a first crop row. The first crop row is plowed by a first plow bottom 130 (e.g., including shank 140a) with a first threshold force 1070 set at a level corresponding to the force applied by an object having the specified weight, 1 kilogram. Further, the operator may desire to only dig up soil and pebbles having a weight of up to 100 grams in a second crop row, which may be adjacent to the first crop row. The second crop row is plowed by the second plow bottom 130 (e.g., including shank 140b) with a second threshold force 1070 set at a level corresponding to the force applied by a 100 gram object, the second specified weight. Therefore, the plow assembly 100 can selectively dig up large rocks or pebbles on a row-by-row basis. In certain embodiments, each plow bottom 130 trip mechanism 330 is set to the same sensitivity, and therefore has the same threshold force 1070.

In block 1530, from within the passenger compartment of the vehicle (also referred to as tractor cab), the operator uses actuators to lower the plow assembly 100 in an initial position 101 down into contact with the ground. In the initial position 101, the entire plow assembly 100 is disposed above the ground and not in contact with the ground.

In certain embodiments, lowering the plow assembly 100 from an initial position 101 includes adjusting the angle of the set of plow bottoms 130. In the initial position 101, the boom 120 is perpendicular to the cross bars of the A-frame 110 (for example, equidistant from the two wings 510). The initial position 101 is shown in FIG. 1. The operator sends a signal from inside the tractor cab for controlling the actuator 180 to adjust the angle of the boom 120. When the boom 120 is in the initial position 101, each plow bottom 130 is horizontally collinear with respect to the width of the cross bars of the A-frame 110. When actuator 180 rotates the front end of the boom 120 to contact the wing 510 of the A-frame 110, the angle of the boom 120 is adjusted away from being perpendicular to the cross bars of the A-frame 110. As a result, each plow bottom 130 coupled to the boom 120 is positioned to plow a width of land spaced horizontally apart from any other plow bottom 130.

In block 1540, as the vehicle pulls the plow assembly 100 forward, the shank 140 of the plow bottom 130 collides with objects including the soil particle, pebbles, large rocks, cotton stalks, sticks, plant roots, and the like. If the object applies a force less than the threshold force 1070 of that plow bottom 130, the plow bottom 130 will continue plowing (block 550). If the object applies an amount of force greater than or equal to the threshold force 1070 of that plow bottom 130, then the trip mechanism 330 will trip causing that plow bottom 130 to disengage or stop plowing (block 1560).

In block 1560, the plow bottom 130 disengages. An object, large enough to apply an amount of force greater than or equal to the threshold force 1070, collides with the curved metal plate 810 of the shank 140. The force of this collision pushes the shank 140 backward translating the force from the back side of the shank 140 to the shank stop 350. The force of the impact causes a top portion of the shank stop 350 to exert the force on the bolt 1050. As the shank stop 350 exerts the force on the bolt 1050, several rotations result at the same time. The swivel 340 rotates at both sets of holes (top set of holes 1010 and bottom set of holes 1020) upwards in the same direction as the shank 140, such that the length of the swivel 340 projects almost parallel with the boom 120. As the bottom of swivel 340, including the bracket 1030, swings backward, the spring 710 connected to the bracket 1030 stretches and also rotates to project almost parallel with the boom 120. The movement of the bottom of the swivel 340 pulls the top of the shank stop 350 up and backward, which also pulls the bottom hole 910 of the shank stop 350 up. Lifting the bottom hole 910 of the shank stop 350 causes a lifting of the shank 140 up above surface level and allows a rotation the of the bottom edge of the shank 140 up and back. The shank 140 releases much of the soil from its surfaces as the shank 140 lifts up and rotates back.

In block 1570, plow assembly 100 is reengaged by lifting the entire plow assembly 100. That is, the operator stops the tractor, and uses actuators in the tractor cab to lift the entire plow assembly 100. When the entire plow assembly 100 is above the ground, none of the plow bottoms 130 are in physical contact with the soil. Any non-disengaged plow bottoms 130 are simply raised vertically. In any disengaged plow bottom 130, the weight of the shank 140 pulls the shank 140 downward into the initial configuration 310. The stretched spring 710 of the disengaged plow bottom 130 contracts using stored energy to automatically (without manual manipulation) reset the trip mechanism 330 by pulling the swivel 340 and shank stop 350 back into near vertical alignment with each other (perpendicular to the boom 120). The trip mechanism 330 is automatically reset to the pre-disengagement threshold force 1070.

After the shanks 140 have returned to the initial configuration 310 (e.g., substantially vertical orientation), the operator can continue plowing by lowering the plow assembly 100 into contact with the ground (block 1530).

The following definitions apply to certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. To the extent definitions for certain words and phrases are provided throughout this patent document, those of ordinary skill in the art should understand that in many, if not most, instances, such definitions apply to prior as well as future uses of such defined words and phrases.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A plow bottom, comprising:
   a shank holder;
   a shank rotably coupled to the shank holder;
   a swivel rotably coupled to the shank holder and comprising a via;
   a shank stop rotably coupled at one end to the swivel and rotably coupled at an opposite end to the shank; and a bolt inserted through the via in the swivel and configured to:

set a threshold force for disengaging the plow bottom upon the shank either striking an object or becoming clogged, wherein the threshold force is an amount of force applied in a direction against the bolt by the shank stop and is determined by an amount of the bolt protruding past an exit side of the via, change the threshold force by protruding the bolt through the swivel, wherein the threshold force decreases as the bolt protrude further past the exit side of the via, and cause the shank to not disengage at any force when the bolt does not protrude past the exit side of the swivel placing the shank stop in a locked position;

wherein the plow bottom is configured to be reengaged by lifting the plow bottom above a top surface of a field being plowed such that the shank is rotated into an initial configuration, causing the plow bottom to automatically reset.

2. The plow bottom of claim 1, wherein the bolt protruding through the via contacts the shank stop.

3. The plow bottom of claim 1, the plow bottom further comprising:

a spring coupled at one end to the shank holder and coupled at an opposite end to the swivel.

4. A plow assembly, comprising:

an A-frame;

a boom; and a plurality of plow bottoms coupled to the boom, wherein each plow bottom comprises:

a shank holder, a shank rotably coupled to the shank holder, a swivel rotably coupled to the shank holder and comprising a via, a shank stop rotably coupled at one end to the swivel and rotably coupled at an opposite end to the shank; and a bolt inserted through the via in the swivel and configured to:

set a threshold force for disengaging the plow bottom upon the shank either striking an object or becoming clogged, wherein the threshold force is an amount of force applied in a direction against the bolt by the shank stop and is determined by an amount of the bolt protruding past an exit side of the via, change the threshold force by protruding the bolt through the swivel, wherein the threshold force decreases as the bolt protrude further past the exit side of the via, and cause the shank to not disengage at any force when the bolt does not protrude past the exit side of the swivel placing the shank stop in a locked position;

wherein the plow bottom is configured to be reengaged by lifting the plow bottom above a top surface of a field being plowed such that the shank is rotated into an initial configuration, causing the plow bottom to automatically reset.

5. The plow assembly of claim 4, wherein the bolt protruding through the via contacts the shank stop.

6. The plow assembly of claim 4, the plow bottoms each further comprising:

a spring coupled at one end to the shank holder and coupled at an opposite end to the swivel.

7. A method, comprising:

setting a threshold force of a trip mechanism for disengaging a plow bottom upon a shank either striking an object or becoming clogged, wherein the threshold force is an amount of force applied in a direction against a bolt by a shank stop and is determined by an amount of the bolt protruding past an exit side of the via in a swivel, causing the shank to not disengage at any force when the bolt does not protrude past the exit side of the swivel placing the shank stop in a locked position;

changing the threshold force by protruding the bolt through the swivel, wherein the threshold force decreases as the bolt protrudes further past the exit side of the via, activating the trip mechanism when the shank of the plow bottom either strikes an object or becomes clogged while plowing a field;

disengaging the plow bottom by rotating the shank about a connection with a shank holder;

lifting the plow bottom such that the shank is entirely lifted above a top surface of the field; and reengaging the plow bottom while lifting the plow bottom by rotating the shank into an initial configuration causing the trip mechanism to automatically reset.

8. The method of claim 7, wherein the locked position does not allow the plow bottom to disengage.

* * * * *